(12) United States Patent
McCall

(10) Patent No.: US 11,928,784 B2
(45) Date of Patent: Mar. 12, 2024

(54) SYSTEMS AND METHODS FOR PRESENTING PERSPECTIVE VIEWS OF AUGMENTED REALITY VIRTUAL OBJECT

(71) Applicant: Magic Leap, Inc., Plantation, FL (US)

(72) Inventor: Marc Alan McCall, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/152,035

(22) Filed: Jan. 9, 2023

(65) Prior Publication Data

US 2023/0162454 A1 May 25, 2023

Related U.S. Application Data

(63) Continuation of application No. 17/374,738, filed on Jul. 13, 2021, now Pat. No. 11,651,565, which is a
(Continued)

(51) Int. Cl.
*G06T 19/00* (2011.01)
*G02B 27/00* (2006.01)
(Continued)

(52) U.S. Cl.
CPC ........ *G06T 19/006* (2013.01); *G02B 27/0093* (2013.01); *G02B 27/017* (2013.01); *G06F 3/011* (2013.01); *G06V 20/64* (2022.01)

(58) Field of Classification Search
CPC .......... G06T 19/006; G02B 27/0093; G02B 27/017; G02B 2027/014;
(Continued)

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

Japanese Office Action dated Nov. 9, 2023, for JP Application No. 2022-141180, with English translation, 12 pages.
(Continued)

*Primary Examiner* — Maurice L. Mcdowell, Jr.
(74) *Attorney, Agent, or Firm* — Morrison & Foerster LLP

(57) ABSTRACT

Examples of the disclosure describe systems and methods for sharing perspective views of virtual content. In an example method, a virtual object is presented, via a display, to a first user. A first perspective view of the virtual object is determined, wherein the first perspective view is based on a position of the virtual object and a position of the first user. The virtual object is presented, via a display, to a second user, wherein the virtual object is presented to the second user according to the first perspective view. A second perspective view of the virtual object is determined, wherein the second perspective view is based on an input from the first user. The virtual object is presented, via a display, to the second user, wherein presenting the virtual object to the second user comprises presenting a transition from the first perspective view to the second perspective view.

20 Claims, 28 Drawing Sheets

Related U.S. Application Data continuation of application No. 16/582,880, filed on Sep. 25, 2019, now Pat. No. 11,094,127.

(60) Provisional application No. 62/736,432, filed on Sep. 25, 2018.

(51) Int. Cl.
  *G02B 27/01* (2006.01)
  *G06F 3/01* (2006.01)
  *G06V 20/64* (2022.01)

(58) Field of Classification Search
  CPC . G02B 2027/0187; G06F 3/011; G06F 3/017; G06F 3/0346; G06V 20/64; G06V 20/20; A63F 13/211; A63F 13/212; A63F 13/213; A63F 13/24; A63F 13/25; A63F 13/428; A63F 13/5255; A63F 13/92
  See application file for complete search history.

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,323,325 B2 | 4/2016 | Perez et al. | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 11,094,127 B2 | 8/2021 | Mccall | |
| 11,651,565 B2 | 5/2023 | Mccall | |
| 2003/0030597 A1 | 2/2003 | Geist | |
| 2004/0189675 A1 | 9/2004 | Pretlove et al. | |
| 2005/0024388 A1 | 2/2005 | Takemoto | |
| 2005/0168486 A1 | 8/2005 | Sato et al. | |
| 2006/0023158 A1 | 2/2006 | Howell et al. | |
| 2006/0227151 A1 | 10/2006 | Bannai | |
| 2008/0211771 A1* | 9/2008 | Richardson | A63F 13/52 345/158 |
| 2011/0211056 A1 | 9/2011 | Publicover et al. | |
| 2011/0213664 A1 | 9/2011 | Osterhout | |
| 2011/0216060 A1 | 9/2011 | Weising et al. | |
| 2012/0021806 A1 | 1/2012 | Maltz | |
| 2012/0210254 A1 | 8/2012 | Fukuchi et al. | |
| 2012/0249591 A1 | 10/2012 | Maciocci et al. | |
| 2012/0274750 A1 | 11/2012 | Strong | |
| 2013/0077147 A1 | 3/2013 | Efimov | |
| 2013/0137076 A1 | 5/2013 | Perez et al. | |
| 2013/0194304 A1 | 8/2013 | Latta et al. | |
| 2013/0215149 A1 | 8/2013 | Hayashi | |
| 2013/0293468 A1 | 11/2013 | Perez | |
| 2014/0195918 A1 | 7/2014 | Friedlander | |
| 2014/0354685 A1 | 12/2014 | Lazarow et al. | |
| 2014/0368534 A1 | 12/2014 | Salter et al. | |
| 2015/0168731 A1 | 6/2015 | Robbins | |
| 2016/0093108 A1 | 3/2016 | Mao et al. | |
| 2016/0292925 A1 | 10/2016 | Montgomerie et al. | |
| 2017/0266554 A1 | 9/2017 | Marks et al. | |
| 2017/0282062 A1 | 10/2017 | Black | |
| 2018/0005429 A1 | 1/2018 | Osman et al. | |
| 2018/0137685 A1 | 5/2018 | Montgomerie | |
| 2018/0174364 A1 | 6/2018 | Copic | |
| 2018/0253900 A1 | 9/2018 | Finding et al. | |
| 2018/0321817 A1* | 11/2018 | Terahata | G06F 3/011 |
| 2019/0143211 A1 | 5/2019 | Tada et al. | |
| 2019/0272674 A1 | 9/2019 | Comer et al. | |
| 2020/0021668 A1 | 1/2020 | Lyons | |
| 2020/0043242 A1 | 2/2020 | Hu et al. | |
| 2020/0066043 A1* | 2/2020 | Graham | A63F 13/428 |
| 2020/0143597 A1 | 5/2020 | Lyren | |
| 2022/0005282 A1 | 1/2022 | Mccall | |

FOREIGN PATENT DOCUMENTS

| | | | |
|---|---|---|---|
| CA | 2388766 | A1 | 12/2003 |
| JP | 2001022958 | A | 1/2001 |
| JP | 2006293604 | A | 10/2006 |
| JP | 2016071900 | A | 5/2016 |
| WO | 2017161276 | A1 | 9/2017 |
| WO | 2018012628 | A1 | 1/2018 |

OTHER PUBLICATIONS

Okajima, Yuta et al. (2010). "An Instructional Method for the Remote MR Collaboration on the Basis of Viewpoint Coordinates", Transactions of Information Processing Society of Japan, Information Processing Society of Japan, 2010, vol. 51, No. 2, p. 564-573 (English translation of abstract only).
Chinese Notice of Allowance dated Jul. 27, 2023, for CN Application No. 201980073915.6, with English translation, 4 pages.
Chinese Office Action dated Jun. 27, 2023, for CN Application No. 201980073915.6, with English translation, 6 pages.
European office Action dated Apr. 24, 2023, for EP Application No. 19864639.0, five pages.
Japanese Notice of Allowance dated Jun. 15, 2023, for JP Application No. 2021-540396, with English translation, 6 pages.
Notice of Allowability dated Mar. 10, 2023, for U.S. Appl. No. 17/374,738, filed Jul. 13, 2021, nine pages.
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.
Bimber, Oliver et al. (2005). "Spatial Augmented Reality: Merging Real and Virtual Worlds," A. K. Peters, Ltd., Wellesley, MA.
Chinese Office Action dated Dec. 1, 2022, for CN Application No. 201980073915.6, with English translation, 15 pages.
European Search Report dated Nov. 16, 2021, for EP Application No. 19864639.0, nine pages.
Final Office Action dated Dec. 22, 2020, for U.S. Appl. No. 16/582,880, filed Sep. 25, 2019, 12 pages.
International Preliminary Report on Patentability dated Apr. 8, 2021 for PCT Application No. PCT/US2019/052992, filed Sep. 25, 2019, 13 pages.
International Search Report and Written Opinion dated Dec. 4, 2019, for PCT Application No. PCT/US2019/052992, filed Sep. 25, 2019, eighteen pages.
Jacob, R. "Eye Tracking in Advanced Interface Design", Virtual Environments and Advanced Interface Design, Oxford University Press, Inc. (Jun. 1995).
Non-Final Office Action dated Aug. 21, 2020, for U.S. Appl. No. 16/582,880, filed Sep. 25, 2019, eleven pages.
Notice of Allowance dated Apr. 14, 2021, for U.S. Appl. No. 16/582,880, filed Sep. 25, 2019, 8 pages.
Notice of Allowance dated Nov. 8, 2022, for U.S. Appl. No. 17/374,738, filed Jul. 13, 2021, eleven pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).

(56) References Cited

OTHER PUBLICATIONS

Japanese Office Action dated Jan. 24, 2023, for JP Application No. 2021-540396, with English translation, 16 pages.

\* cited by examiner

SYSTEMS AND METHODS FOR PRESENTING PERSPECTIVE VIEWS OF AUGMENTED REALITY VIRTUAL OBJECT

CROSS-REFERENCE TO RELATED APPLICATIONS

This application is a continuation of U.S. Non-Provisional application Ser. No. 17/374,738, filed Jul. 13, 2021, which is a continuation of U.S. Non-Provisional application Ser. No. 16/582,880, filed on Sep. 25, 2019, now U.S. Pat. No. 11,094,127, issued Aug. 17, 2021, which claims priority to U.S. Provisional Application No. 62/736,432, filed on Sep. 25, 2018, the contents of which are incorporated by reference herein in their entirety.

FIELD

This disclosure relates in general to systems and methods for sharing and presenting visual signals, and in particular to systems and methods for sharing and presenting visual signals corresponding content in a mixed reality environment.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world.

Correct placement of this virtual imagery in the real world for life-like augmented reality (or "mixed reality") requires a series of intercoupled coordinate frameworks.

The human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. Display components, such as eyepieces for a head-mounted display, may be asymmetrically positioned to a user's eyes. For example, a binocular system may place one eyepiece closer or farther to a given eye (e.g., as compared to a complementary eyepiece and eye). In a monocular system, alignment of the monolithic eyepiece may be at an angle, such that a left/right eye is not similarly positioned to the other eye.

Complicating the variation in fit as described above is the motion of the user's head or changes to the user's position otherwise.

As an example, if a user wearing a head-worn display views a virtual representation of a three-dimensional (3D) object on the display and walks around the area where the 3D object appears, that 3D object may be re-rendered for each viewpoint, giving the user the perception that he or she is walking around an object that occupies real space. If the head-worn display is used to present multiple objects within a virtual space (for instance, a rich virtual world), measurements of head pose (i.e., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user.

In some augmented reality technology such as Google Glass®, virtual content is displayed in a fixed position. In such examples, the virtual content and the device share a common coordinate frame, as any motion of the device will similarly change the position of the virtual content.

In some augmented reality or mixed reality systems, a series of coordinate frames ensures the virtual content appears fixed to the real world or environment the device is in, rather than fixed to the device itself.

SUMMARY

Examples of the disclosure describe systems and methods for sharing perspective views of virtual content. In an example method, a virtual object is presented, via a display, to a first user. A first perspective view of the virtual object is determined, wherein the first perspective view is based on a position of the virtual object and a first position of the first user. The virtual object is presented, via a display, to a second user, wherein the virtual object is presented to the second user according to the first perspective view. An input is received from the first user. A second perspective view of the virtual object is determined, wherein the second perspective view is based on the input from the first user. The virtual object is presented, via a display, to the second user, wherein presenting the virtual object to the second user comprises presenting a transition from the first perspective view to the second perspective view.

DETAILED DESCRIPTION

Figure 1:
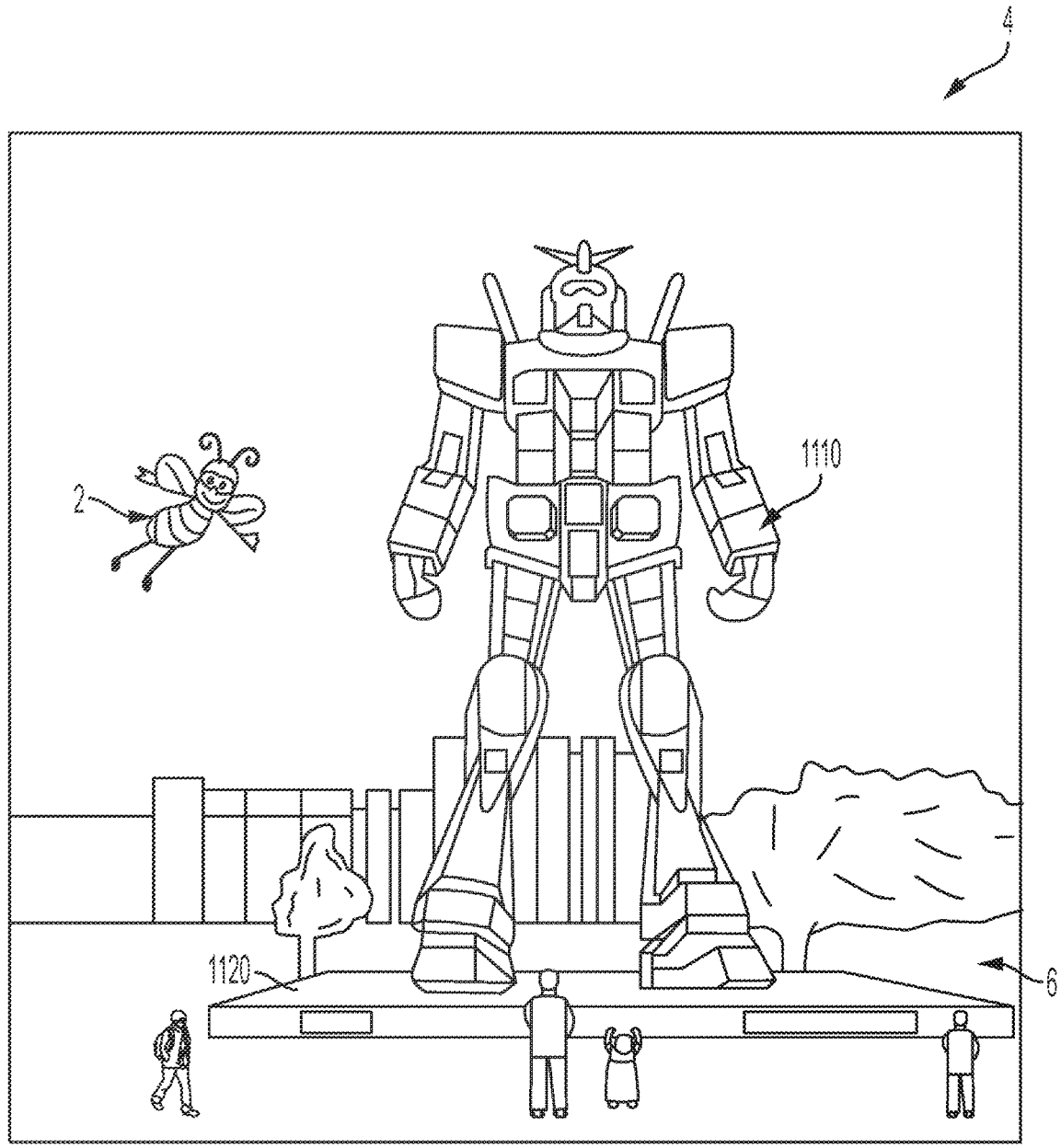
FIG. 1 illustrates an augmented reality scenario with certain virtual reality object according to some embodiments.

The present invention relates to systems and methods to create a plurality of coordinate frames for determining relative position of virtual content, a head mounted display (HMD) for presenting AR content to at least one user, and a user's eye positions.

Additional embodiments, advantages, and details are described in greater detail below with specific reference to the figures as appropriate.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input (e.g., real world parameters), to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality ("MR") environment that combines aspects of a real environment and a virtual environment. In some embodiments, the one or more speakers may be external to the head-mounted wearable unit. As used herein, an MR environment is a simultaneous representation of a real environment and a corresponding virtual environment. In some examples, the corresponding real and virtual environments share a single coordinate space; in some examples, a real coordinate space and one or more corresponding virtual coordinate spaces are related to each other by a transformation matrix (or other suitable representation). Accordingly, in some embodiments, a single coordinate (along with, in some examples, a transformation matrix) can define a first location in the real environment, and also a second, corresponding, location in the virtual environment; and vice versa.

In an MR environment, a virtual object (e.g., in a virtual environment associated with the MR environment) can correspond to a real object (e.g., in a real environment associated with the MR environment). For instance, if the real environment of an MR environment comprises a real lamp post (a real object) at a location coordinate, the virtual environment of the MR environment may comprise a corresponding virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MR environment, not all real objects in a real environment may be associated with a corresponding virtual object. Likewise, in some examples of an MR environment, not all virtual objects in a virtual environment may be associated with a corresponding real object. That is, some virtual objects may solely in a virtual environment of an MR environment, without any real-world counterpart. In some examples, not all real objects may be associated with a corresponding real object.

In some examples, virtual objects may have characteristics that differ, sometimes drastically, from those of corresponding real objects. For instance, while a real environment in an MR environment may comprise a green, two-armed cactus—a prickly inanimate object—a corresponding virtual object in the MR environment may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MR environment affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

Figure 12A:
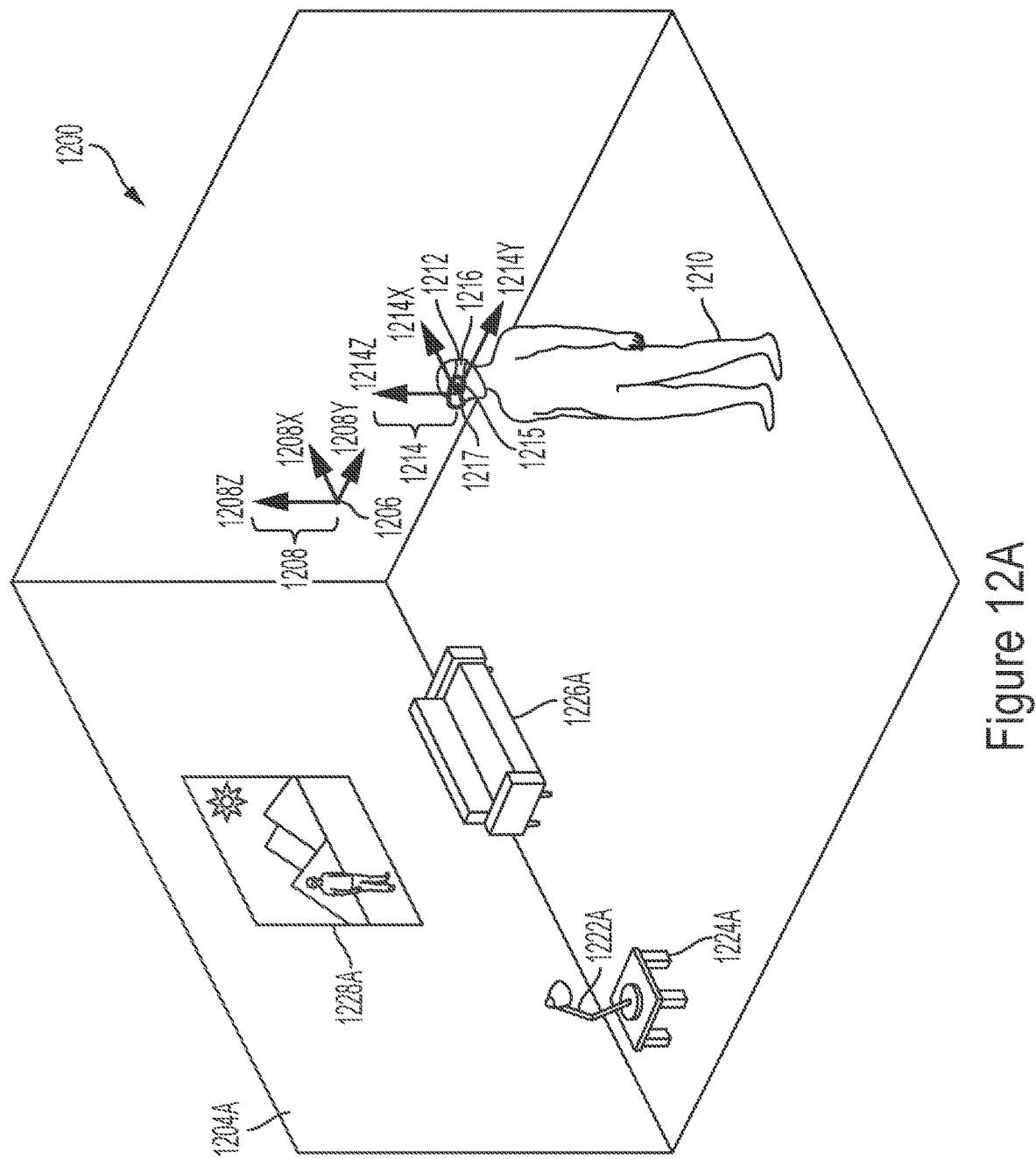
FIGS. 12A-12C illustrate an example mixed reality environment.

FIG. 12A illustrates an example real environment 1200 in which a user 1210 uses a mixed reality system 1212. Mixed reality system 1212 may comprise a display (e.g., a transmissive display) and one or more speakers, and one or more sensors (e.g., a camera), for example as described below. The real environment 1200 shown comprises a rectangular room 1204A, in which user 1210 is standing; and real objects 1222A (a lamp), 1224A (a table), 1226A (a sofa), and 1228A (a painting). Room 1204A further comprises a location coordinate 1206, which may be considered an origin of the real environment 1200. As shown in FIG. 12A, an environment/world coordinate system 1208 (comprising an x-axis 1208X, a y-axis 1208Y, and a z-axis 1208Z) with its origin at point 1206 (a world coordinate), can define a coordinate space for real environment 1200. In some embodiments, the origin point 1206 of the environment/world coordinate system 1208 may correspond to where the mixed reality system 1212 was powered on. In some embodiments, the origin point 1206 of the environment/world coordinate system 1208 may be reset during operation. In some examples, user 1210 may be considered a real object in real environment 1200; similarly, user 1210's body parts (e.g., hands, feet) may be considered real objects in real environment 1200. In some examples, a user/listener/head coordinate system 1214 (comprising an x-axis 1214X, a y-axis 1214Y, and a z-axis 1214Z) with its origin at point 1215 (e.g., user/listener/head coordinate) can define a coordinate space for the user/listener/head on which the mixed reality system 1212 is located. The origin point 1215 of the user/listener/head coordinate system 1214 may be defined relative to one or more components of the mixed reality system 1212. For example, the origin point 1215 of the user/listener/head coordinate system 1214 may be defined relative to the display of the mixed reality system 1212 such as during initial calibration of the mixed reality system 1212. A matrix (which may include a translation matrix and a Quaternion matrix or other rotation matrix), or other suitable representation can characterize a transformation between the user/listener/head coordinate system 1214 space and the environment/world coordinate system 1208 space. In some embodiments, a left ear coordinate 1216 and a right ear coordinate 1217 may be defined relative to the origin point 1215 of the user/listener/head coordinate system 1214. A matrix (which may include a translation matrix and a Quaternion matrix or other rotation matrix), or other suitable representation can characterize a transformation between the left ear coordinate 1216 and the right ear coordinate 1217, and user/listener/head coordinate system 1214 space. The user/listener/head coordinate system 1214 can simplify the representation of locations relative to the user's head, or to a head-mounted device, for example, relative to the environment/world coordinate system 1208. Using Simultaneous Localization and Mapping (SLAM), visual odometry, or other techniques, a transformation between user coordinate system 1214 and environment coordinate system 1208 can be determined and updated in real-time.

Figure 12B:
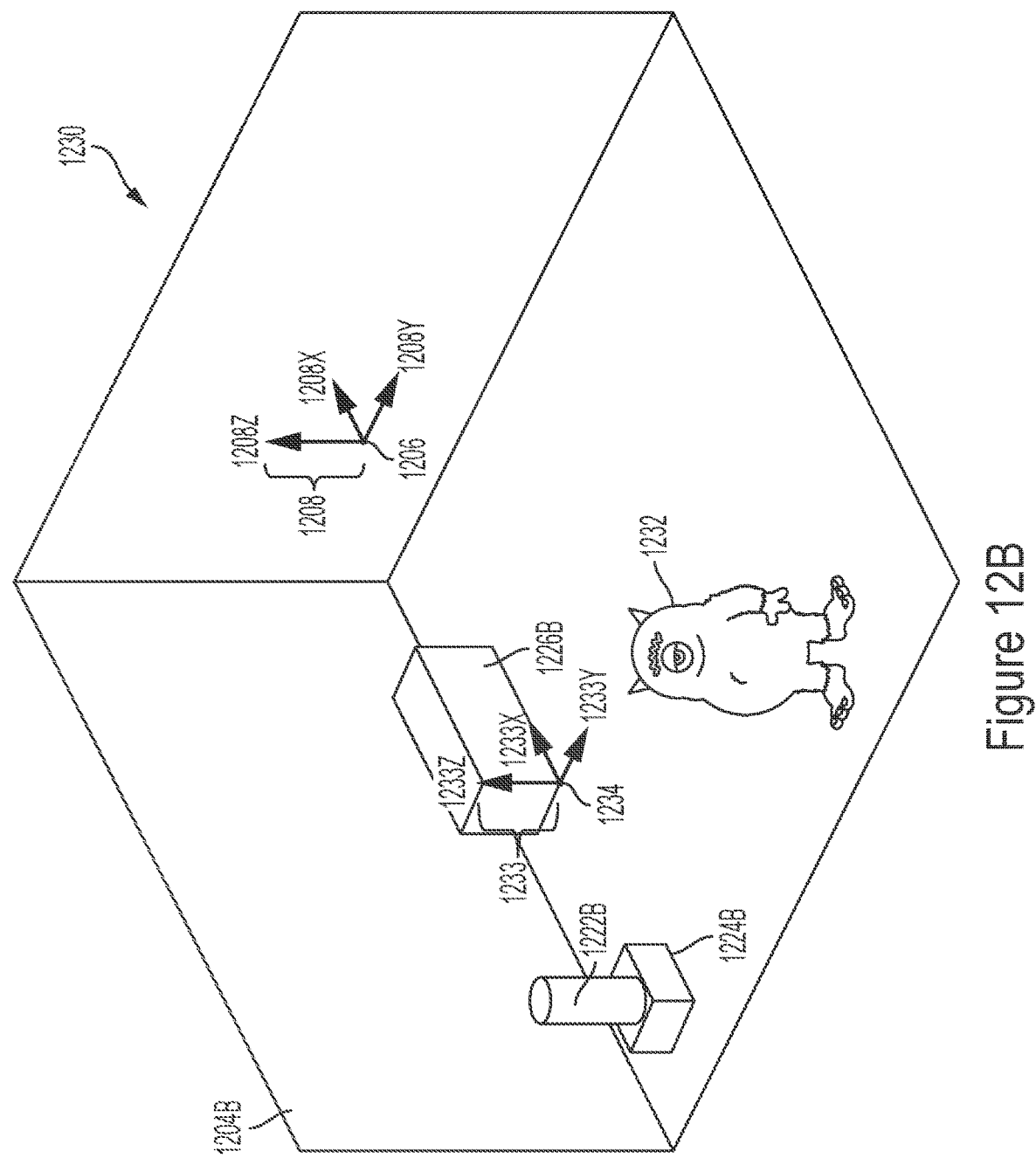

FIG. 12B illustrates an example virtual environment 1230 that corresponds to real environment 1200. The virtual environment 1230 shown comprises a virtual rectangular room 1204B corresponding to real rectangular room 1204A; a virtual object 1222B corresponding to real object 1222A; a virtual object 1224B corresponding to real object 1224A; and a virtual object 1226B corresponding to real object 1226A. Metadata associated with the virtual objects 1222B, 1224B, 1226B can include information derived from the corresponding real objects 1222A, 1224A, 1226A. Virtual environment 1230 additionally comprises a virtual monster 1232, which does not correspond to any real object in real environment 1200. Real object 1228A in real environment 1200 does not correspond to any virtual object in virtual environment 1230. A persistent coordinate system 1233 (comprising an x-axis 1233X, a y-axis 1233Y, and a z-axis 1233Z) with its origin at point 1234 (persistent coordinate), can define a coordinate space for virtual content. The origin point 1234 of the persistent coordinate system 1233 may be defined relative/with respect to one or more real objects, such as the real object 1226A. A matrix (which may include a translation matrix and a Quaternion matrix or other rotation matrix), or other suitable representation can characterize a transformation between the persistent coordinate system 1233 space and the environment/world coordinate system 1208 space. In some embodiments, each of the virtual objects 1222B, 1224B, 1226B, and 1232 may have their own persistent coordinate point relative to the origin point 1234 of the persistent coordinate system 1233. In some embodiments, there may be multiple persistent coordinate systems and each of the virtual objects 1222B, 1224B, 1226B, and 1232 may have their own persistent coordinate point relative to one or more persistent coordinate systems.

With respect to FIGS. 12A and 12B, environment/world coordinate system 1208 defines a shared coordinate space for both real environment 1200 and virtual environment 1230. In the example shown, the coordinate space has its origin at point 1206. Further, the coordinate space is defined by the same three orthogonal axes (1208X, 1208Y, 1208Z). Accordingly, a first location in real environment 1200, and a second, corresponding location in virtual environment 1230, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 12C:
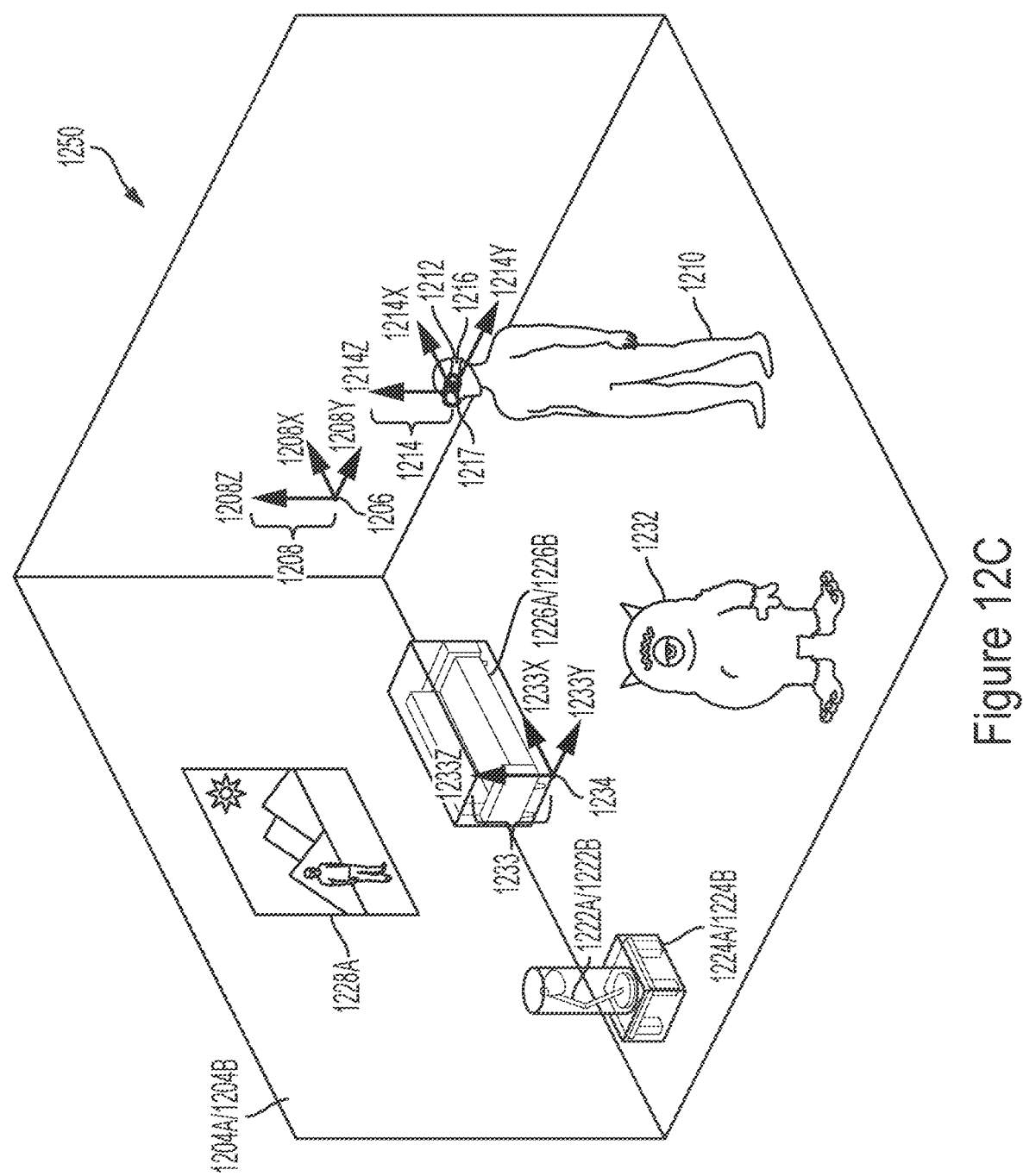

FIG. 12C illustrates an example MR environment 1250 that simultaneously presents aspects of real environment 1200 and virtual environment 1230 to user 1210 via mixed reality system 1212. In the example shown, MR environment 1250 simultaneously presents user 1210 with real objects 1222A, 1224A, 1226A, and 1228A from real environment 1200 (e.g., via a transmissive portion of a display of mixed reality system 1212); and virtual objects 1222B, 1224B, 1226B, and 1232 from virtual environment 1230 (e.g., via an active display portion of the display of mixed reality system 1212). As above, origin point 1206 acts as an origin for a coordinate space corresponding to MR environment 1250, and coordinate system 1208 defines an x-axis, y-axis, and z-axis for the coordinate space.

In the example shown, mixed reality objects comprise corresponding pairs of real objects and virtual objects (i.e., 1222A/1222B, 1224A/1224B, 1226A/1226B) that occupy corresponding locations in coordinate space 1208. In some examples, both the real objects and the virtual objects may be simultaneously visible to user 1210. This may be desirable in, for example, instances where the virtual object presents information designed to augment a view of the corresponding real object (such as in a museum application where a virtual object presents the missing pieces of an ancient damaged sculpture). In some examples, the virtual objects (1222B, 1224B, and/or 1226B) may be displayed (e.g., via active pixelated occlusion using a pixelated occlusion shutter) so as to occlude the corresponding real objects (1222A, 1224A, and/or 1226A). This may be desirable in, for example, instances where the virtual object acts as a visual replacement for the corresponding real object (such as in an interactive storytelling application where an inanimate real object becomes a "living" character).

In some examples, real objects (e.g., 1222A, 1224A, 1226A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MR environment 1250, virtual monster 1232 could be associated with one or more audio signals, such as a footstep sound effect that is generated as the monster walks around MR environment 1250. As described further below, a processor of mixed reality system 1212 can compute an audio signal corresponding to a mixed and processed composite of all such sounds in MR environment 1250, and present the audio signal to user 1210 via one or more speakers included in mixed reality system 1212 and/or one or more external speakers.

Example Mixed Reality System

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
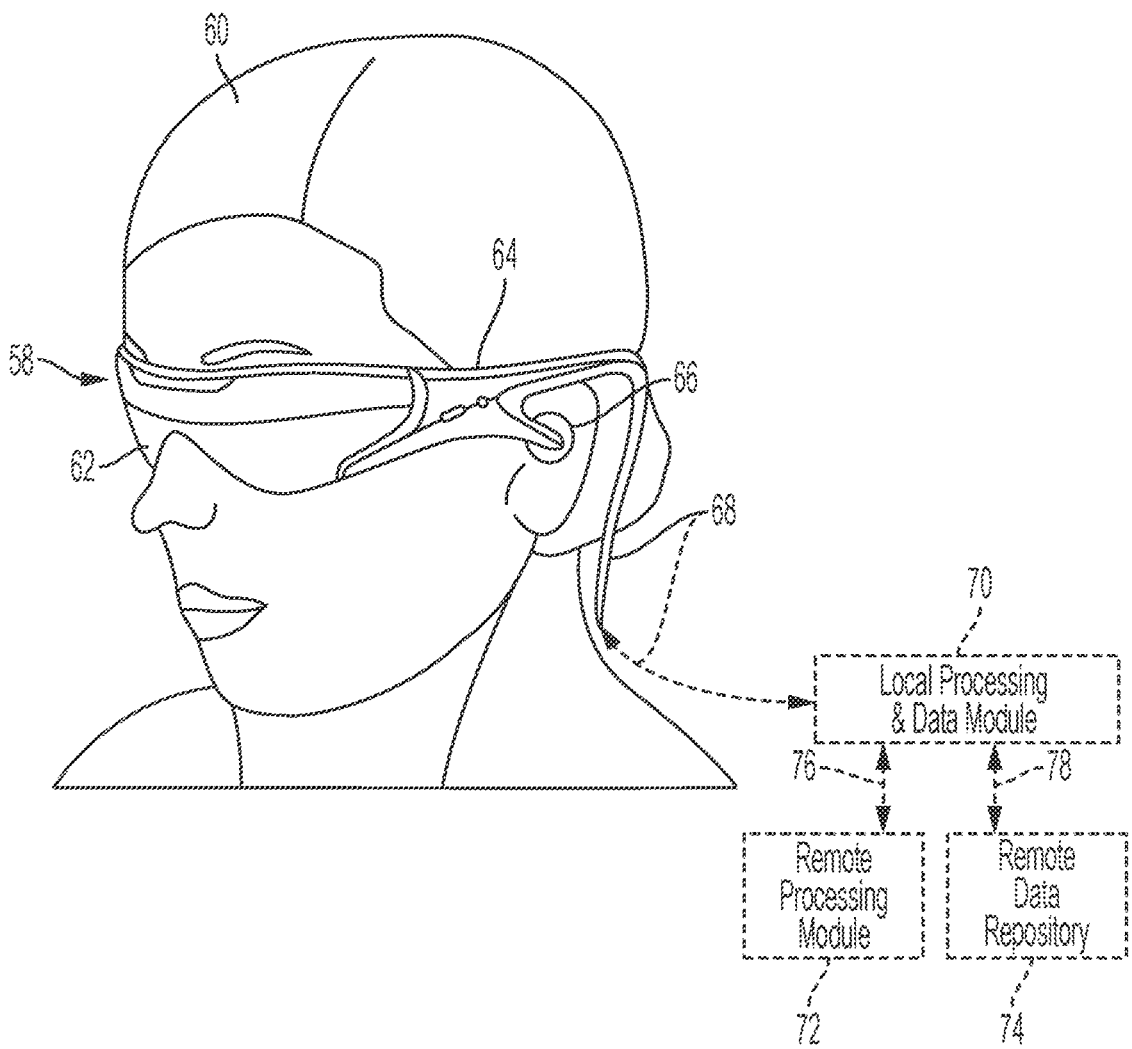
FIGS. 2A-2C illustrate various configurations of components comprising a visual display system according to some embodiments.
Figure 2B:
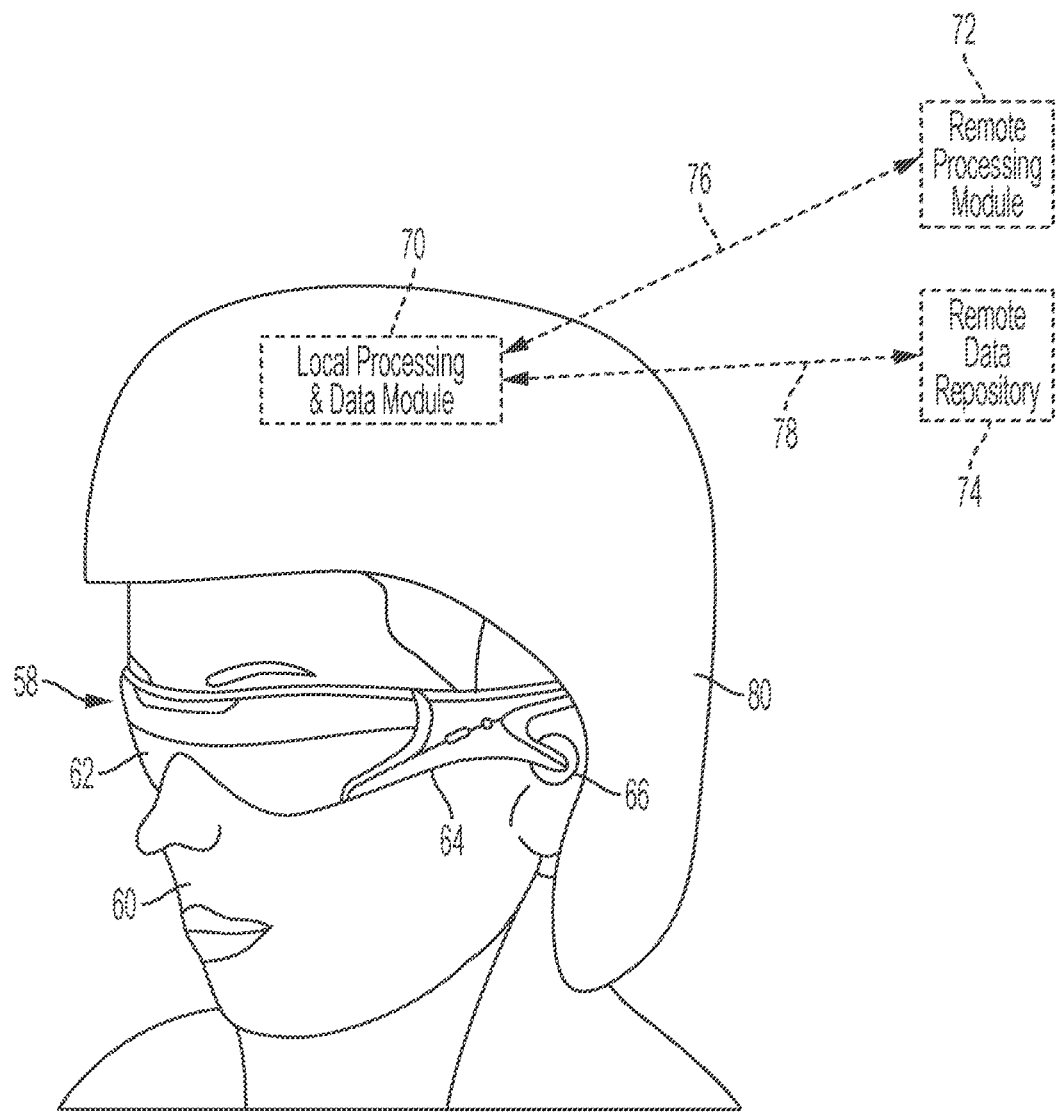
Figure 2C:
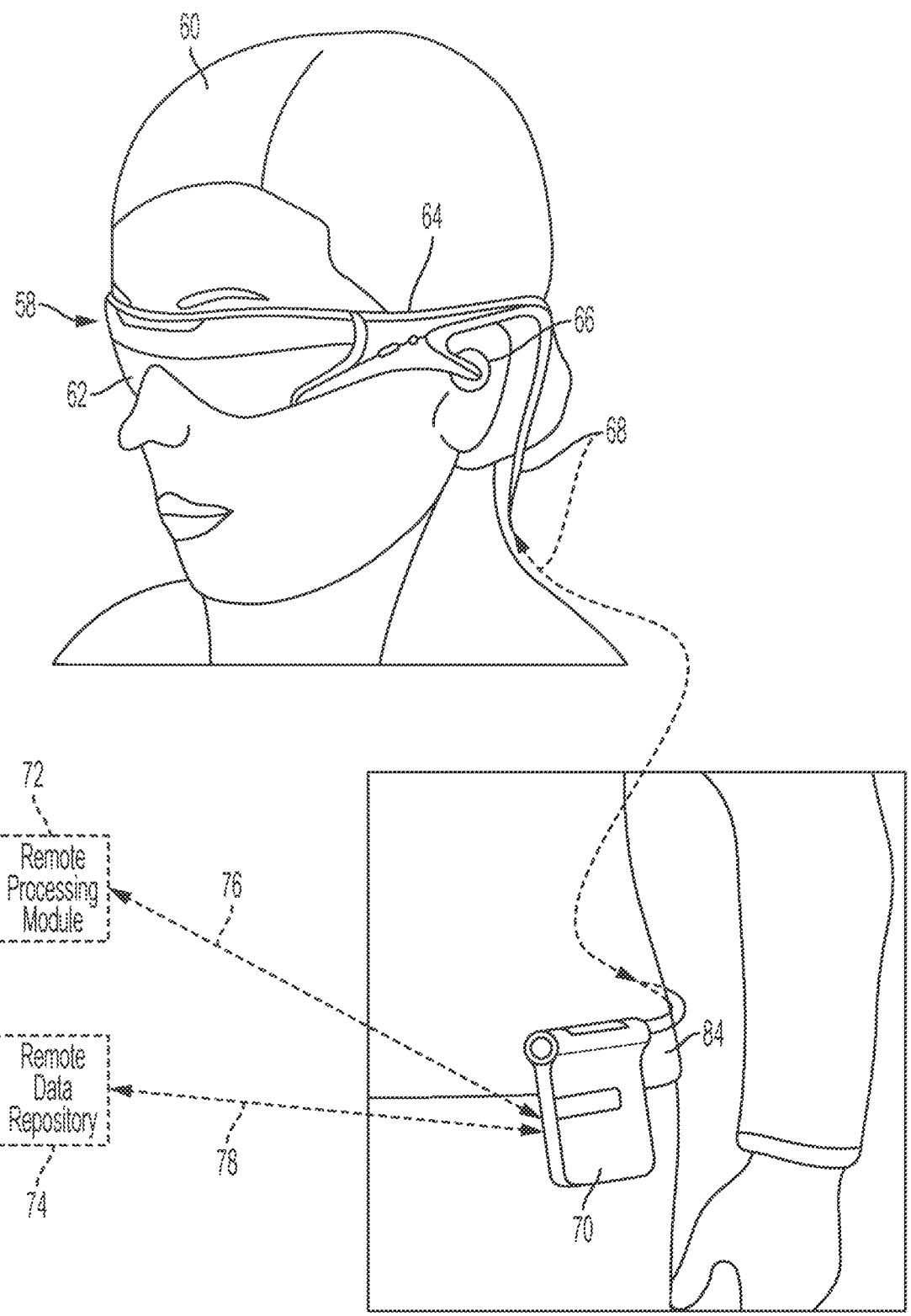

As shown in FIG. 2A, an AR system user (60) is depicted wearing an exemplary head mounted component (58) featuring a frame (64) structure coupled to a display system (62) positioned in front of the eyes of the user. A speaker (66) can be coupled to the frame (64) in the depicted configuration and positioned adjacent the ear canal of the user. (In one embodiment, another speaker, not shown, can be positioned adjacent the other ear canal of the user to provide for stereo/shapeable sound control). The display (62) can be operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso of the user (60) in a backpack-style configuration, or removably attached to the hip (84) of the user (60) in a belt-coupling style configuration as shown in the embodiment of FIG. 2C.

The local processing and data module (70) may comprise a power-efficient processor or controller, as well as digital memory, such as flash memory, both of which may be utilized to assist in the processing, caching, and storage of data captured from sensors which may be operatively coupled to the frame (64), such as image capture devices (such as cameras), microphones, inertial measurement units, accelerometers, compasses, GPS units, radio devices, and/or gyros; and/or data acquired and/or processed using the remote processing module (72) and/or remote data repository (74), possibly for passage to the display (62) after such processing or retrieval.

The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data can be stored and all computation can be performed in the local processing and data module, allowing fully autonomous use from any remote modules.

Example Mixed Reality System

Example mixed reality system 1212—which can correspond to the example AR system depicted in FIGS. 2A-2D—can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 1212 can incorporate any suitable display technology, and any suitable sensors (e.g., optical, infrared, acoustic, LIDAR, EOG, GPS, magnetic). In addition, mixed reality system 1212 may incorporate networking features (e.g., Wi-Fi capability) to communicate with other devices and systems, including other mixed reality systems. Mixed reality system 1212 may further include a battery (which may be mounted in an auxiliary unit, such as a belt pack designed to be worn around a user's waist), a processor, and a memory. The wearable head device of mixed reality system 1212 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 1212 may also include a handheld controller 1400, and/or an auxiliary unit 1420, which may be a wearable beltpack, as described further below.

Figure 13A:
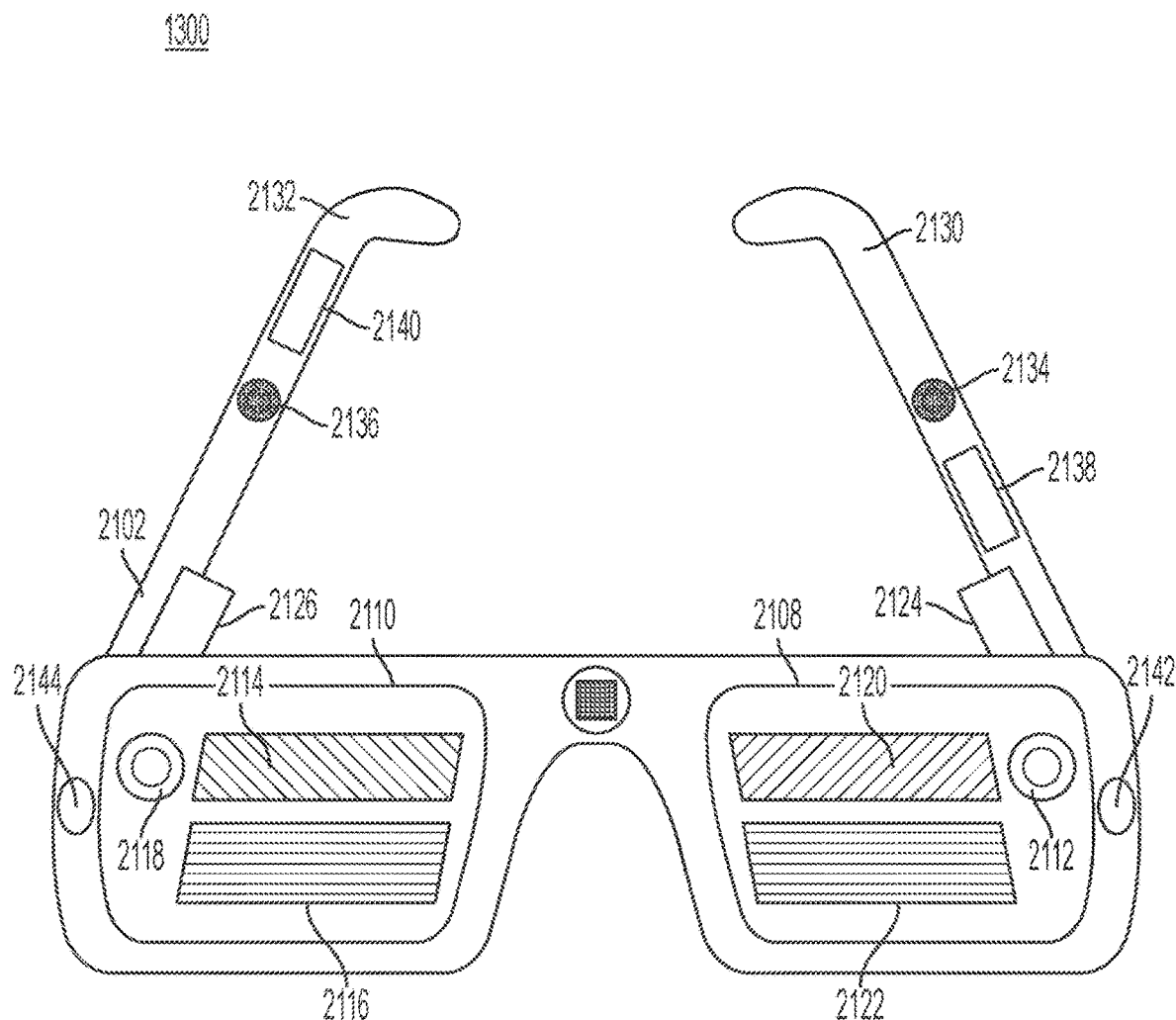
FIGS. 13A-13D illustrate components of an example mixed reality system that can be used to generate and interact with a mixed reality environment.
Figure 13B:
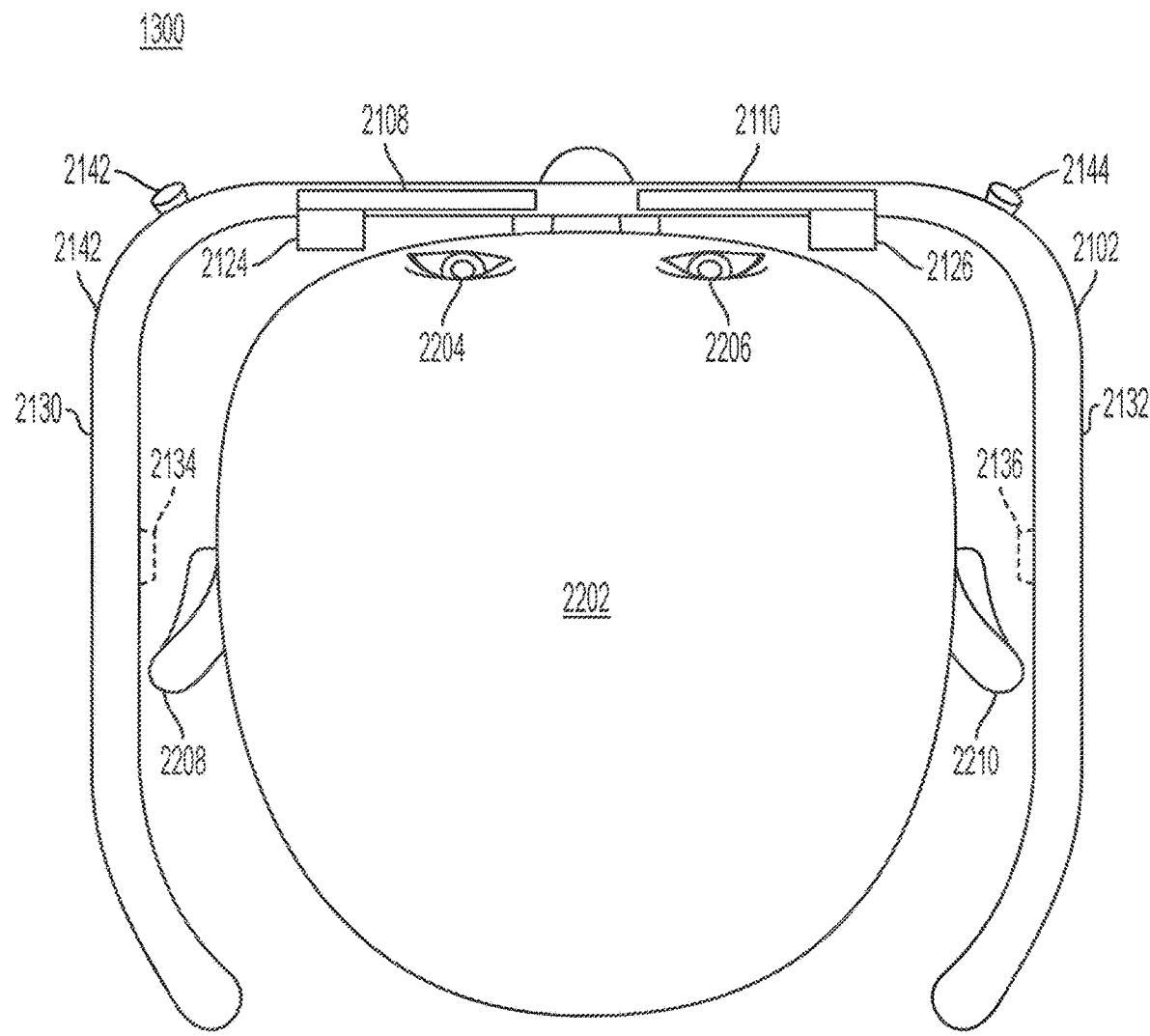
Figure 13C:
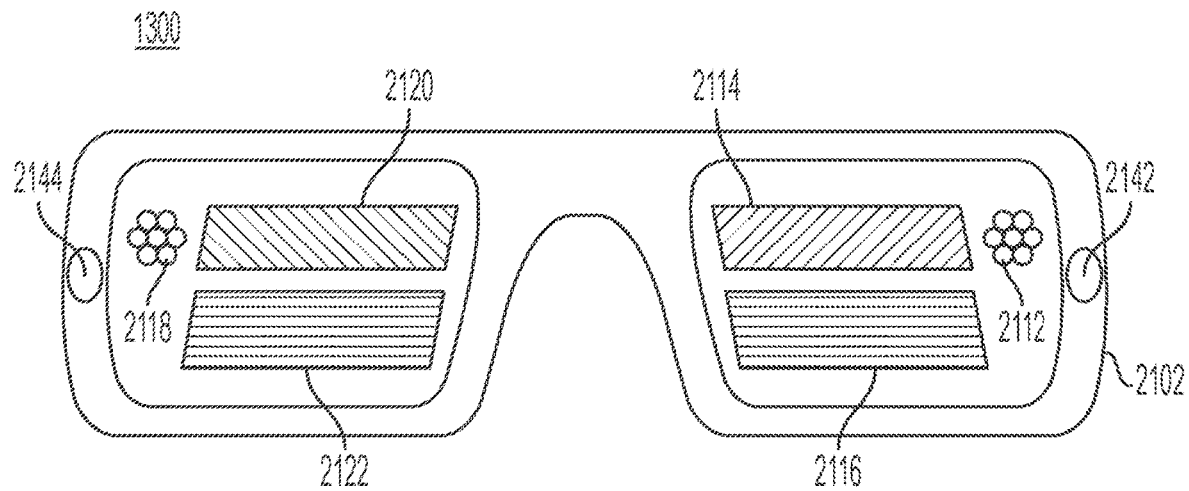
Figure 13D:
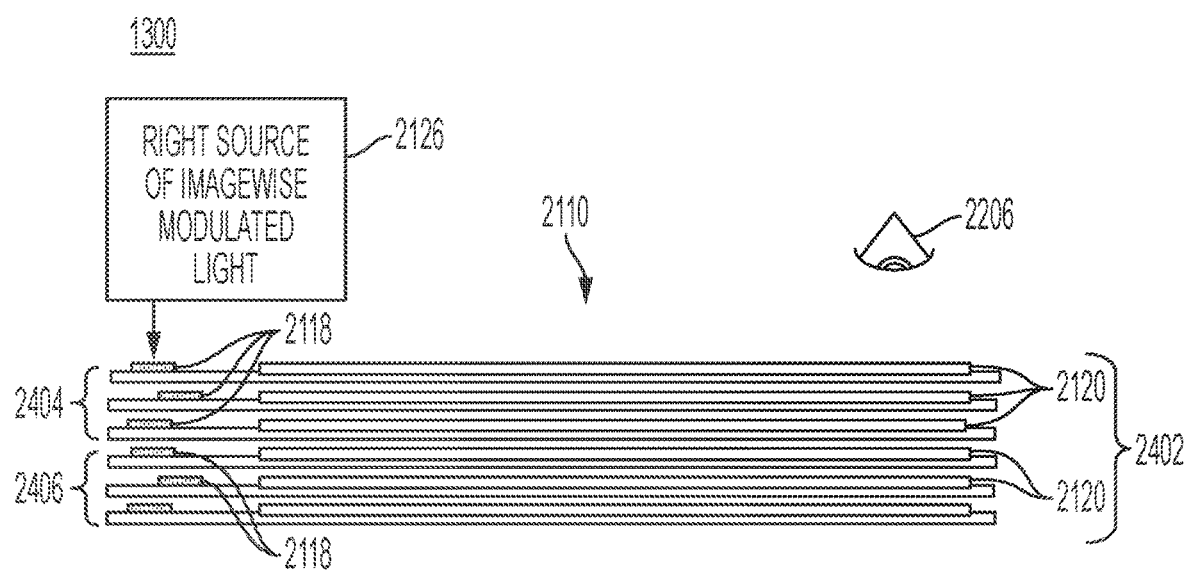

FIGS. 13A-13D illustrate components of an example mixed reality system 1300 (which may correspond to mixed reality system 1212) that may be used to present an MRE (which may correspond to MRE 1250), or other virtual environment, to a user. FIG. 13A illustrates a perspective view of a wearable head device 2102 included in example mixed reality system 1300. FIG. 13B illustrates a top view of wearable head device 2102 worn on a user's head 2202. FIG. 13C illustrates a front view of wearable head device 2102. FIG. 13D illustrates an edge view of example eyepiece 2110 of wearable head device 2102. As shown in FIGS. 13A-13C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136.

An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 13A-13D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 13D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 13D illustrates an edge-facing view from the top of the right eyepiece 2110 of example wearable head device 2102. As shown in FIG. 13D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 13D, the structure of the left eyepiece 2108 is analogous to the structure of the right eyepiece 2110.)

Figure 14A:
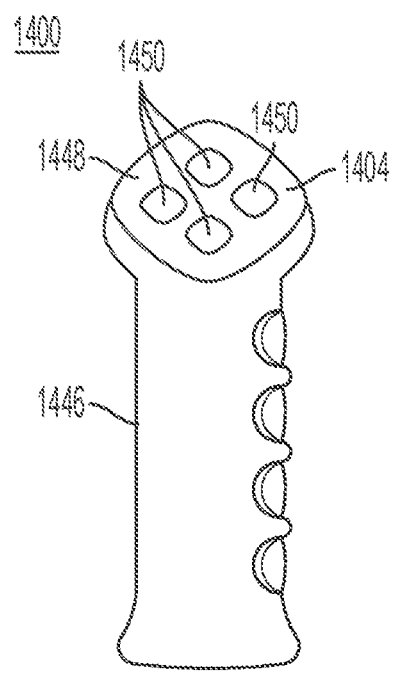
FIG. 14A illustrates an example mixed reality handheld controller that can be used to provide input to a mixed reality environment.

FIG. 14A illustrates an example handheld controller component 1400 of a mixed reality system 1300. In some examples, handheld controller 1400 includes a grip portion 1446 and one or more buttons 1450 disposed along a top surface 1448. In some examples, buttons 1450 may be configured for use as an optical tracking target, e.g., for tracking six-degree-of-freedom (6DOF) motion of the handheld controller 1400, in conjunction with a camera or other optical sensor (which may be mounted in a head unit (e.g., wearable head device 2102) of mixed reality system 1300). In some examples, handheld controller 1400 includes tracking components (e.g., an IMU or other suitable sensors) for detecting position or orientation, such as position or orientation relative to wearable head device 2102. In some examples, such tracking components may be positioned in a handle of handheld controller 1400, and/or may be mechanically coupled to the handheld controller. Handheld controller 1400 can be configured to provide one or more output signals corresponding to one or more of a pressed state of the buttons; or a position, orientation, and/or motion of the handheld controller 1400 (e.g., via an IMU). Such output signals may be used as input to a processor of mixed reality system 1300. Such input may correspond to a position, orientation, and/or movement of the handheld controller (and, by extension, to a position, orientation, and/or movement of a hand of a user holding the controller). Such input may also correspond to a user pressing buttons 1450.

Figure 14B:
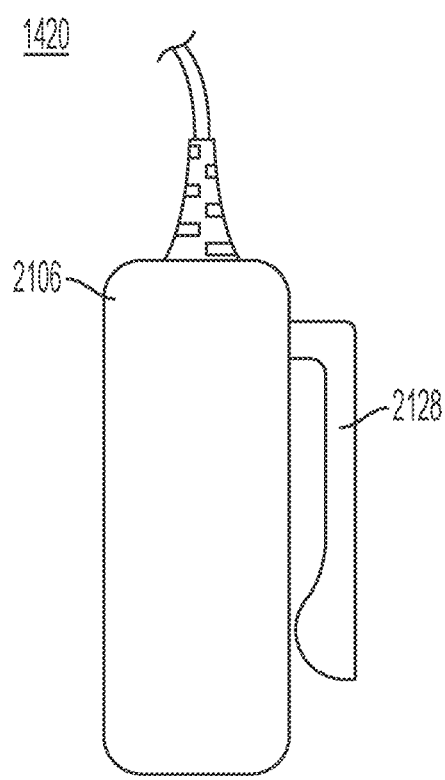
FIG. 14B illustrates an example auxiliary unit that can be used with an example mixed reality system.
Figure 15:
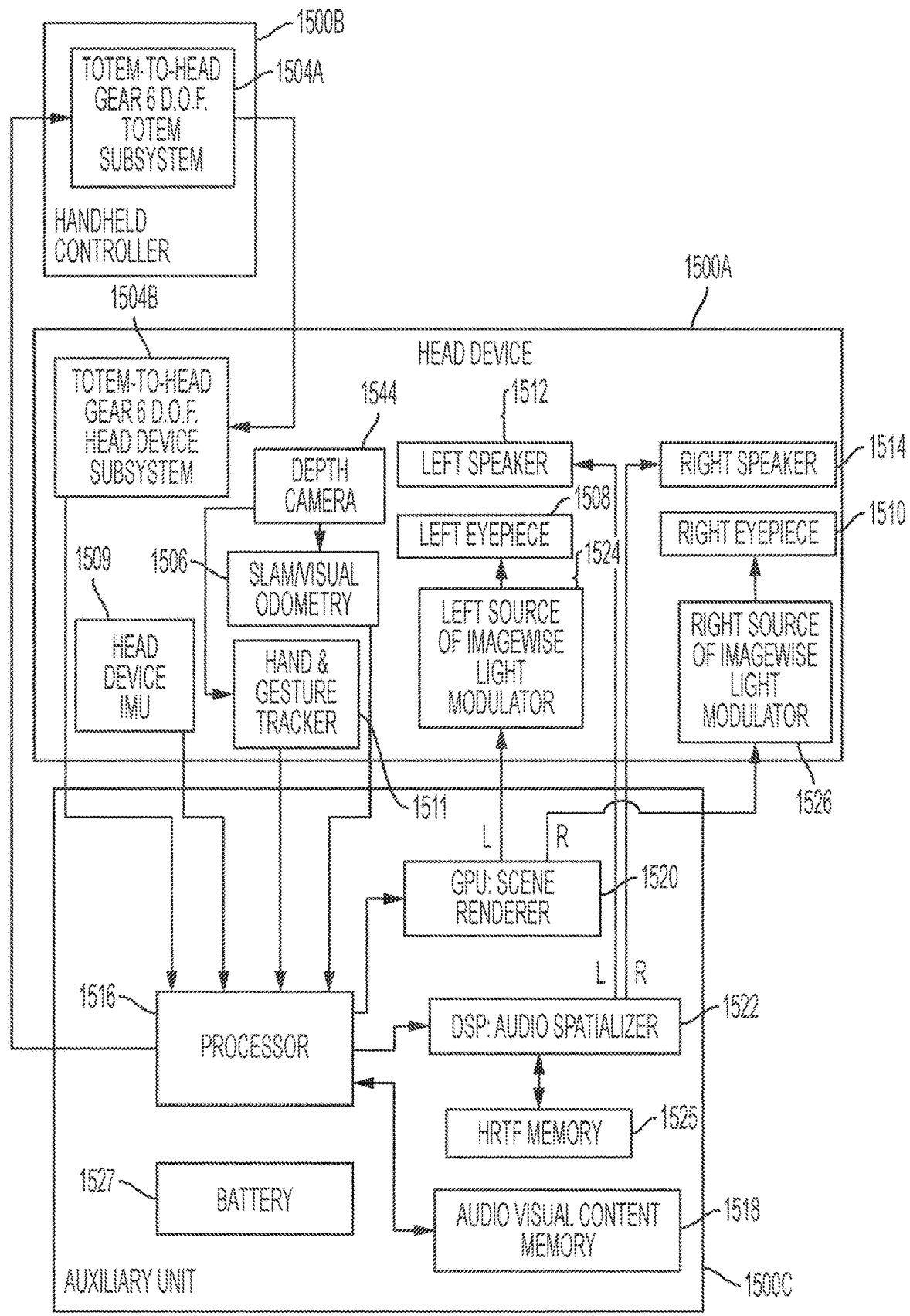
FIG. 15 illustrates an example functional block diagram for an example mixed reality system.

FIG. 14B illustrates an example auxiliary unit 1420 of a mixed reality system 1300. The auxiliary unit 1420 can include a battery to provide energy to operate the system 1300, and can include a processor for executing programs to operate the system 1300. As shown, the example auxiliary unit 1420 includes a clip 2128, such as for attaching the auxiliary unit 1420 to a user's belt. Other form factors are suitable for auxiliary unit 1420 and will be apparent, including form factors that do not involve mounting the unit to a user's belt. In some examples, auxiliary unit 1420 is coupled to the wearable head device 2102 through a multiconduit cable that can include, for example, electrical wires and fiber optics. Wireless connections between the auxiliary unit 1420 and the wearable head device 2102 can also be used.

In some examples, mixed reality system 1300 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 1400 and/or auxiliary unit 1420. Such a microphone may be configured to detect environmental sounds, ambient noise, voices of a user or a third party, or other sounds.

Example Mixed Reality Network Architecture

Figure 3:
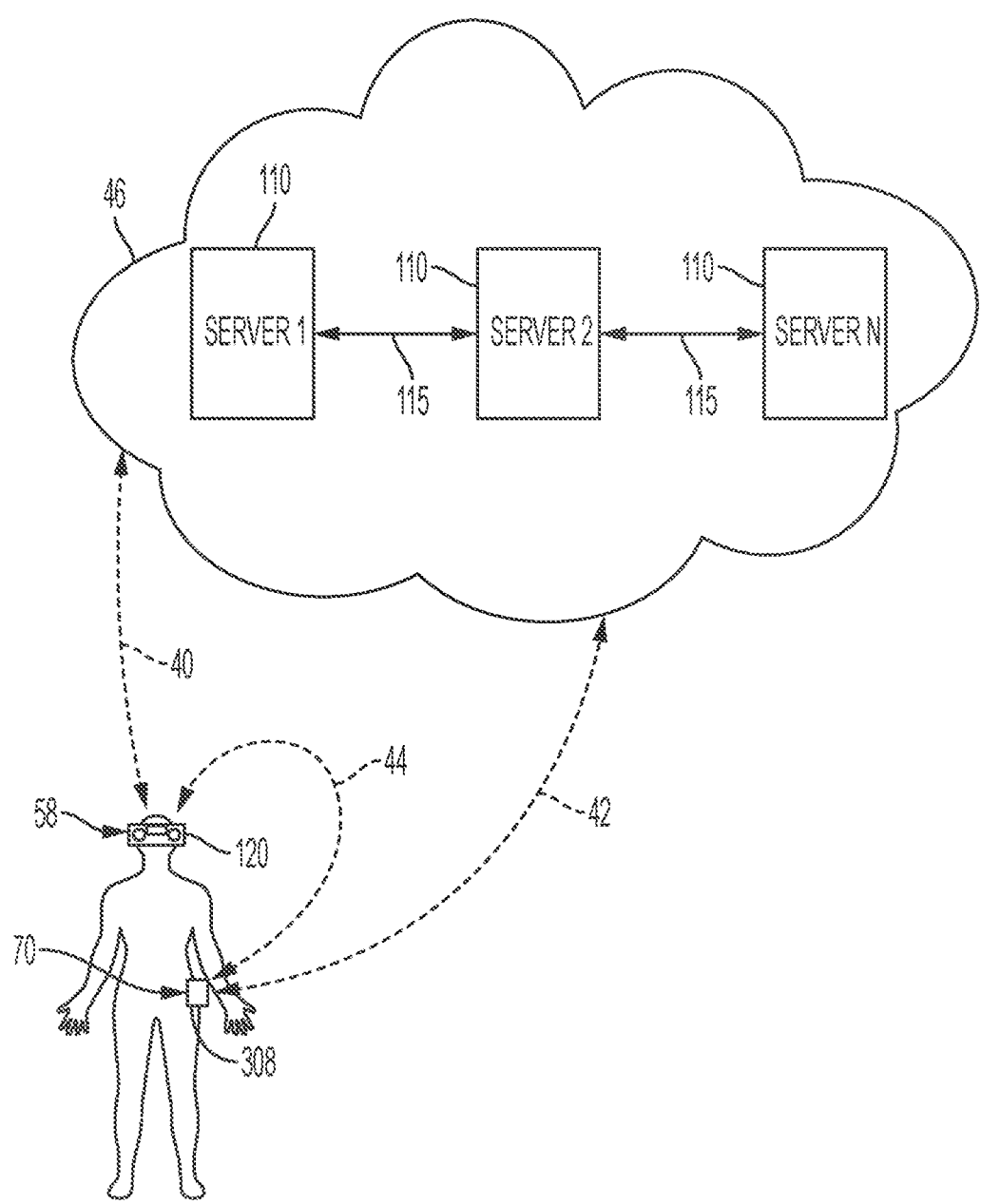
FIG. 3 illustrates remote interaction with cloud computing assets according to some embodiments.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308). Component 70 may also be termed a "belt pack" 70. In one embodiment, the cloud (46) assets, such as one or more server systems (110) can be operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud. The head mounted (120) subsystem can be primarily data-tethered to the belt-based (308) subsystem using wireless connectivity, such as ultra-wideband ("UWB") connectivity, which can be employed in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3D and 2D points, parametric information and other information about the real world. As more and more AR users continually capture information about their real environment (e.g., through cameras, sensors, IMUs, etc.), the map can become more and more accurate and complete.

With a configuration as described above, wherein there is one world model that can reside on cloud computing resources and be distributed from there, such world can be "passable" to one or more users in a relatively low bandwidth form, which can be preferable to passing around real-time video data or the like. The augmented experience of the person standing near the statue (i.e., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system may need to know where the street is, where the trees are, where the statue is. In some embodiments, such information can be stored on the cloud, and the joining friend can download from the cloud aspects of the scenario, and then start walking along as an augmented reality local relative to the person who is actually in the park.

3D points may be captured from the environment, and the pose (i.e., vector and/or origin position information relative to the world) of the cameras that capture those images or points may be determined, so that these points or images may be "tagged", or associated, with this pose information. Points captured by a second camera may be utilized to determine the pose of the second camera. In other words, one can orient and/or localize a second camera based upon comparisons with tagged images from a first camera. This knowledge may be utilized to extract textures, make maps, and create a virtual copy of the real world (because then there are two cameras around that are registered).

So at the base level, in one embodiment a person-worn system can be utilized to capture both 3D points and the 2D images that produced the points, and these points and images may be sent out to a cloud storage and processing resource. They may also be cached locally with embedded pose information (i.e., cache the tagged images); so the cloud may have on the ready (i.e., in available cache) tagged 2D images (i.e., tagged with a 3D pose), along with 3D points. If a user is observing something dynamic, additional information may be sent up to the cloud pertinent to the motion (for example, if looking at another person's face, a texture map of the face can be taken and pushed up at an optimized frequency even though the surrounding world is otherwise basically static). More information on object recognizers and the passable world model may be found in U.S. patent application Ser. No. 14/205,126, entitled "System and method for augmented and virtual reality", which is incorporated by reference in its entirety herein.

Mixed Reality Coordinate Frames

Figure 4:
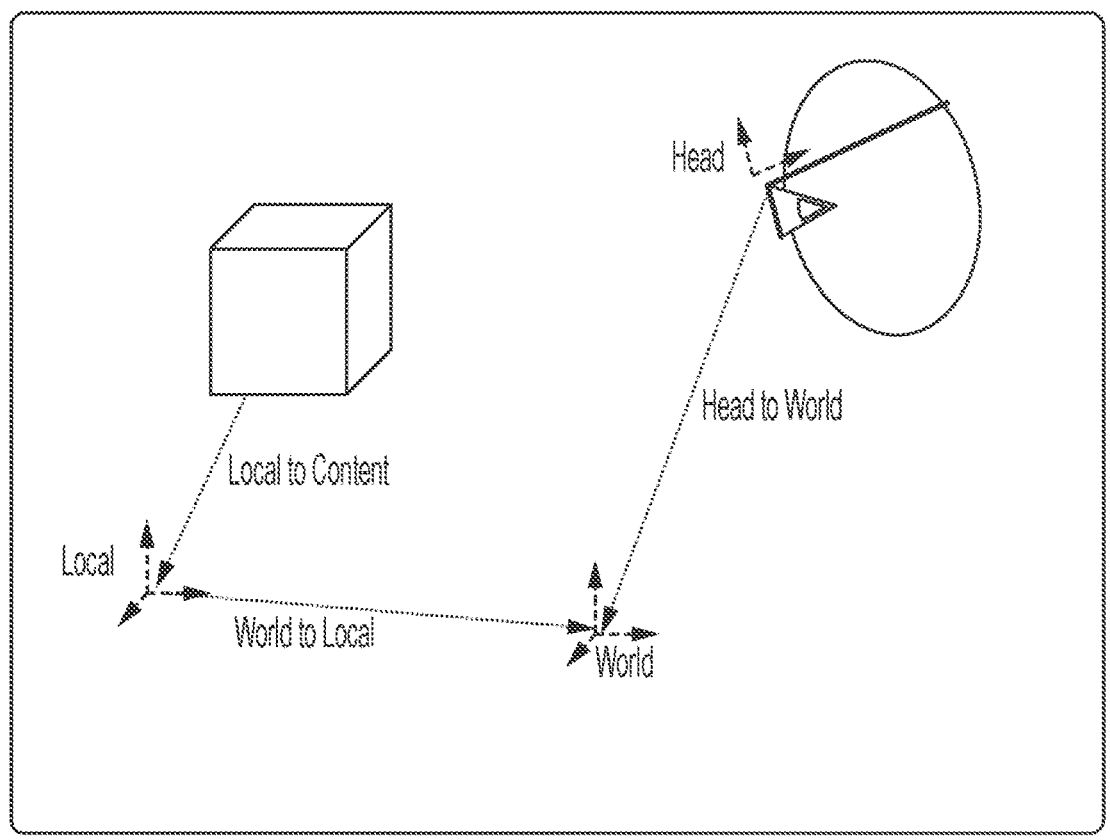
FIG. 4 illustrates a single user coordinate frame system with virtual content according to some embodiments.

FIG. 4 illustrates an exemplary environment of a user wearing a HMD AR device having a "head" coordinate frame. The HMD can create a "world" coordinate frame, such as by passable world creation and mapping described above, wherein the user's head position and orientation can be measured relative to the world coordinate frame. The environment can also comprise virtual content having its own "local" coordinate frame. Placement of the virtual content may be processed by the HMD by applying a transform from the local to world coordinate frames.

By giving the virtual content its own coordinate frame, as opposed to being measured directly to the world coordinate frame as the user's head can be, the virtual content may choose a more persistent frame position. For example, if a virtual lamp is placed on a table, there could be a plurality of data points on the table to provide placement input for relative positioning of the virtual lamp that do not substantially change over time. By contrast, if a world map is created as a function of a certain orientation and position, and the user changes position or orientation thus necessitating a new world coordinate frame, the virtual lamp may continue to utilize the same local coordinate frame rather than adjust to a new world framework which may introduce jitter or positional shifts in the appearance of the lamp.

In some embodiments, a coordinate frame can be established by using sensors of a mixed reality system (e.g., mixed reality system 1212 or 1300). For example, a world coordinate frame can be created using depth sensors, time-of-flight cameras, LIDAR sensors, and/or RGB cameras to identify placement of physical objects in relation to each other. A mixed reality system used in a room can identify physical features of a room and identify placement of those features. For example, a mixed reality system can determine the placement of a desk relative to a chair relative to a cabinet relative to the floor relative to the walls. As a user walks around the room, a world coordinate frame can be refined as physical objects are viewed from different angles and/or different distances to more accurately determine relative positions. A mixed reality system can also establish a local coordinate frame using more localized features as compared to a world coordinate frame. For example, a local coordinate frame can be established for a desk by identifying features of the desk and identifying relative placement of those features. Corners of a desk can be identified and placed in relation to each other such that a virtual object can be displayed as sitting on the desk as if it were a real object. The virtual object can be placed using a local coordinate frame (e.g., the virtual object's position is determined relative to the corners of the desk). A local coordinate frame (e.g., of the desk) can then be transformed to the world coordinate frame that can place the desk relative to other physical objects in the room.

Figure 5:
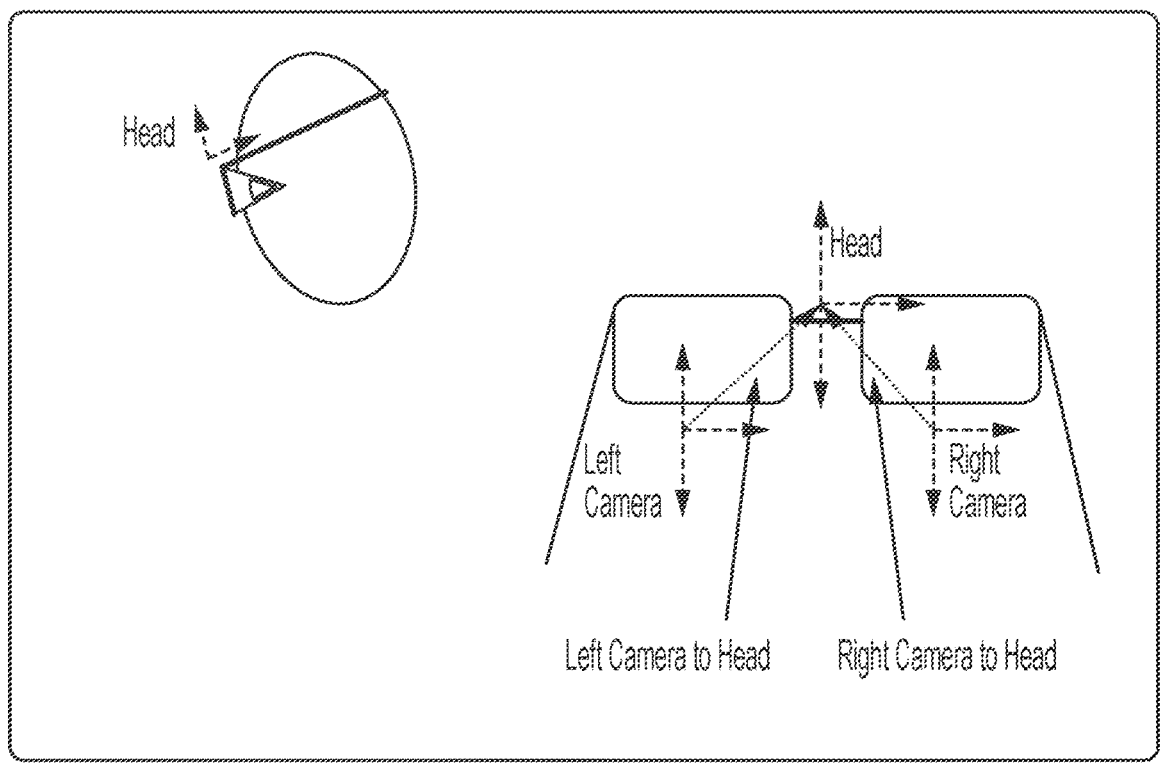
FIG. 5 illustrates a user device coordinate frame to binocular render cameras according to some embodiments.

FIG. 5 depicts a further coordinate frame transform between the head coordinate frame and render cameras for either display unit (i.e. a left/right in a binocular system or a single system in a monocular field of view). As display mediums may vary in position to a user's eyes, where virtual content is rendered relative to that position may require further coordinate frame analysis. Position for a render camera to a head coordinate frame may be provided by calibration level intrinsics. If content were projected to a display irrespective of a render camera, then changes in eye position may warp the intended position of the content. Further discussion of a render camera transform is provided below.

Figure 6:
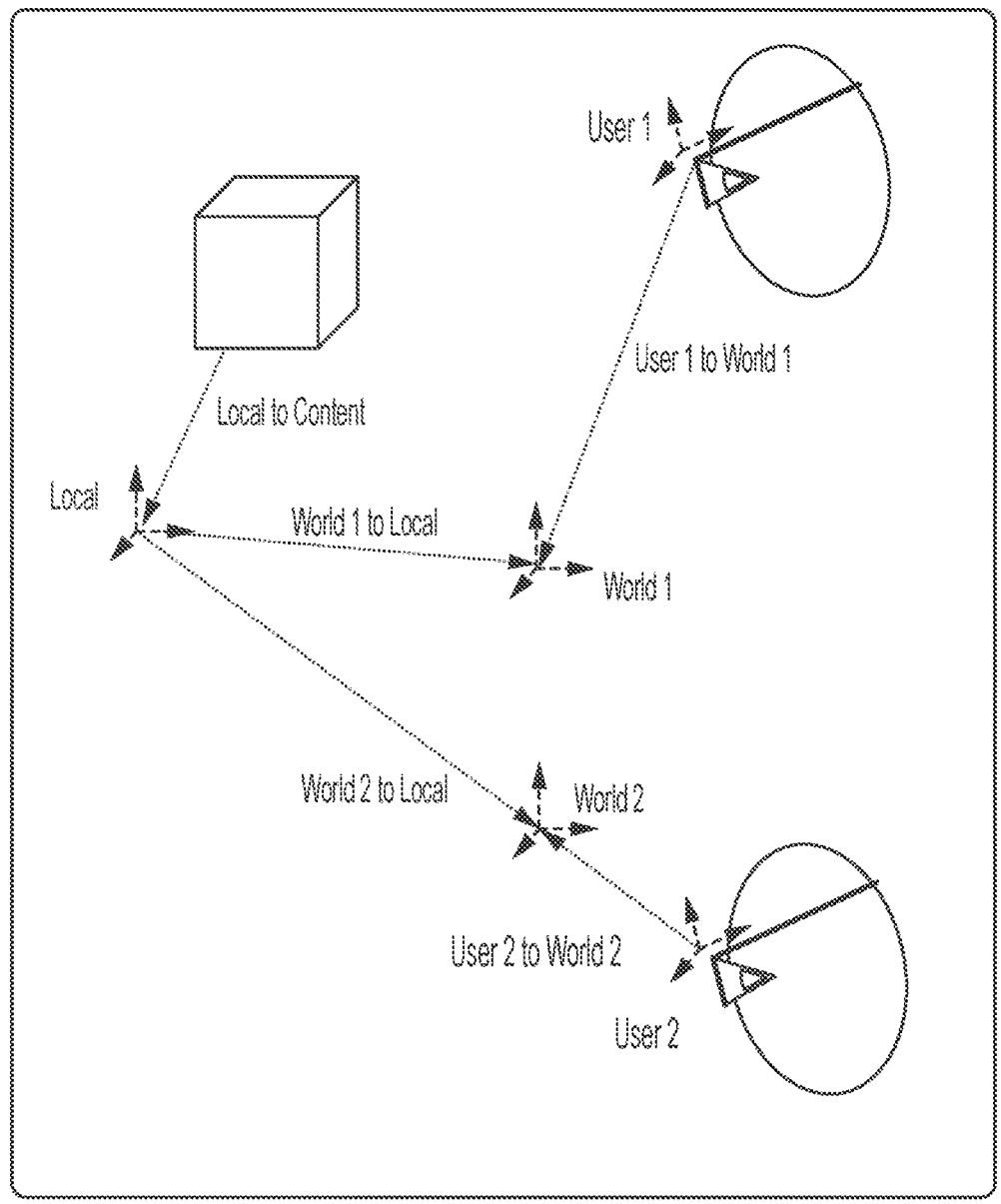
FIG. 6 illustrates a multi-user coordinate frame system with virtual content according to some embodiments.

FIG. 6 displays a multi-user system wherein User 1 and User 2 are observing the same virtual content. As depicted, world coordinate frames may have been created relative to each user's own device, and the virtual content can have a local coordinate frame that then transforms to either world coordinate frame (e.g., world 1 and world 2).

Figure 7:
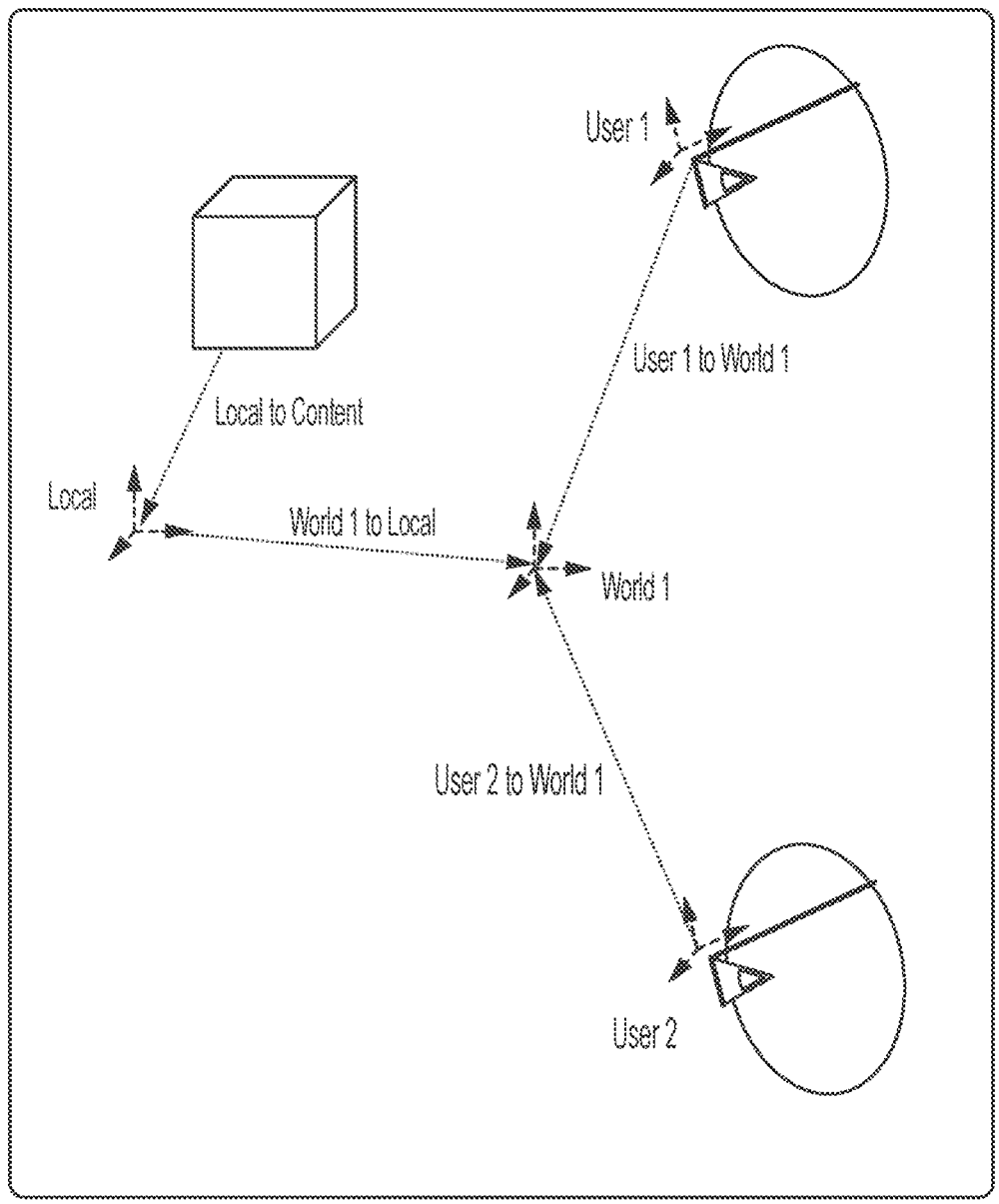
FIG. 7 illustrates a multi-user sharing coordinate frame system with virtual content according to some embodiments.

In some embodiments, and as shown in FIG. 7, the Users 1 and 2 can share a world coordinate frame. This can prevent minor variations in world coordinate frame quality and system noise from giving disparate views of the common content.

Figure 8A:
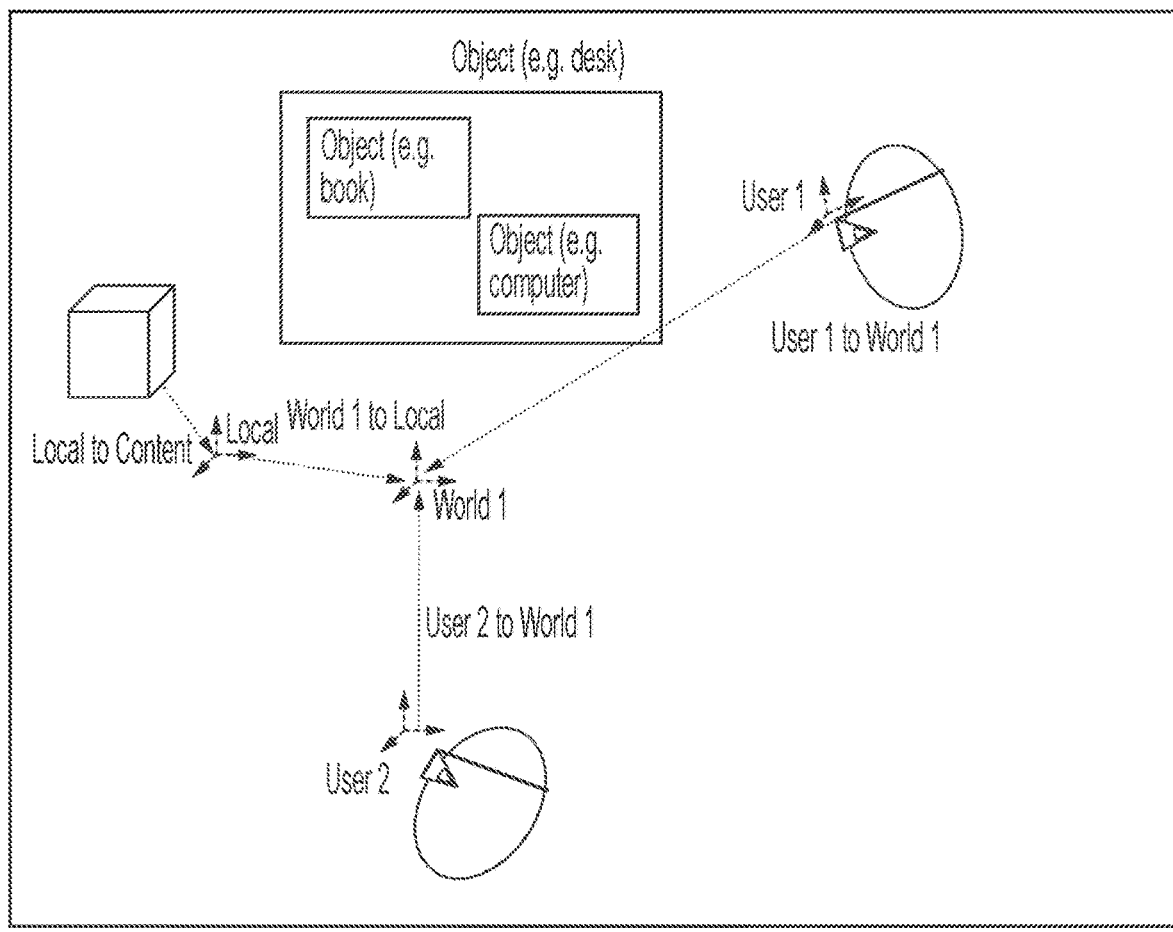
FIGS. 8A-8C illustrate world frame selection protocols among users according to some embodiments.

For example, in FIG. 8A, User 1 and User 2 are inside a room, but User 2 is closer to a wall on the left side, and as a result as User 2 looks towards content near that wall has fewer data points to collect and create a reliable long term world coordinate frame. By contrast, as User 1 looks at the virtual content, there are more objects in the line of sight from which to create a reliable world coordinate frame. User 2 can utilize the world coordinate frame as created by User 1. Map quality analysis and world coordinate frame suitability is enabled further in conjunction with U.S. Patent Application No. 62/702,829, "Methods and Apparatuses for Determining and/or Evaluating Localization Maps of Head-Worn Image Display Devices," the contents of which is hereby incorporated by reference in its entirety.

Figure 8B:
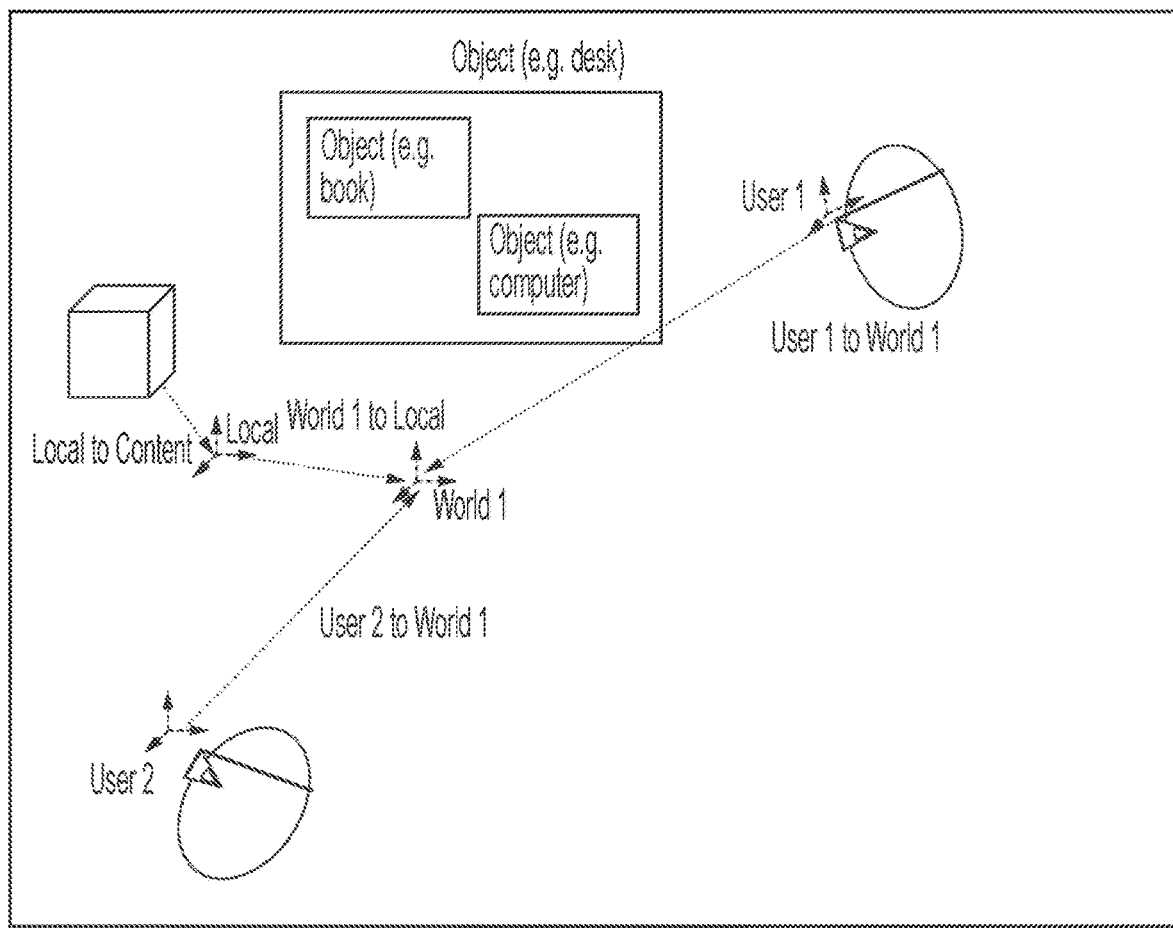
Figure 8C:
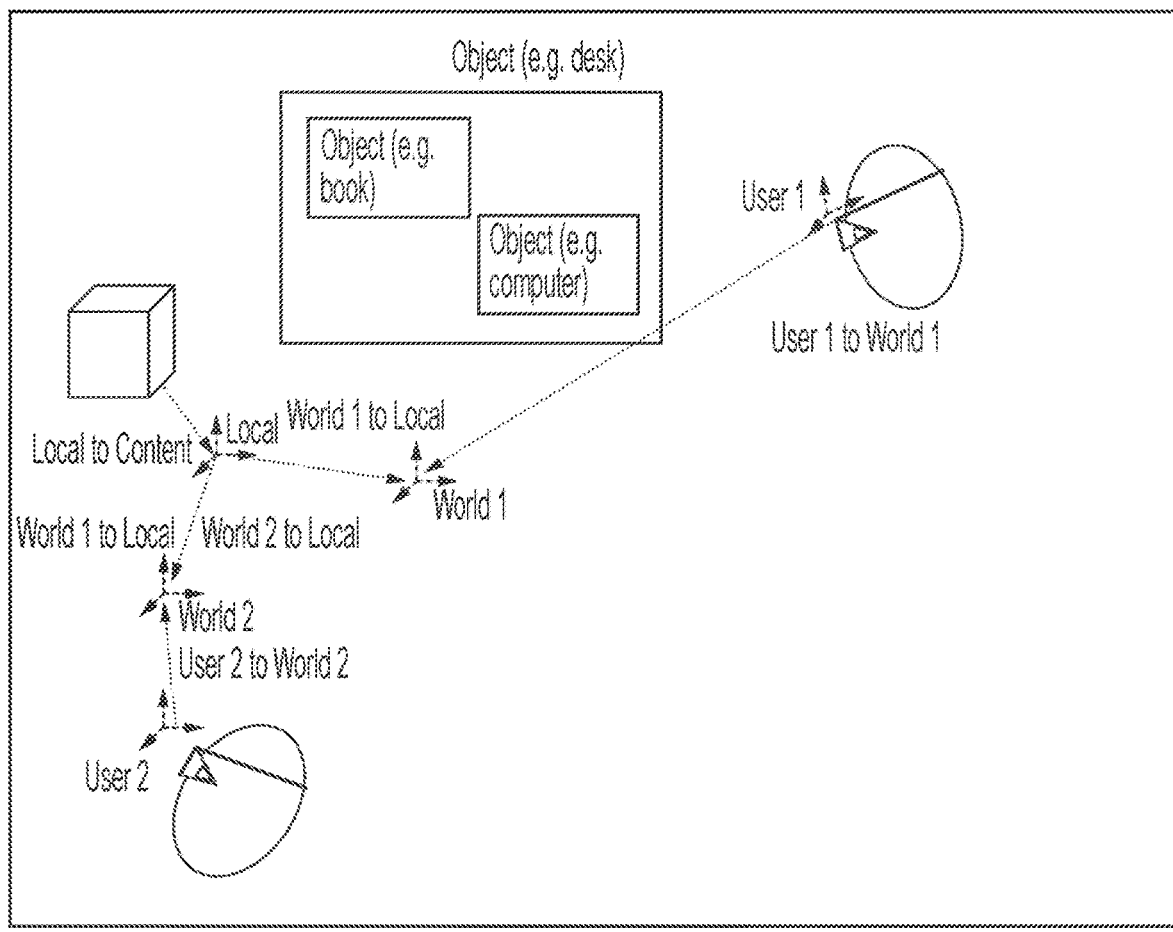

If User 2 moves closer the wall, as in FIG. 8B, it is possible that the world coordinate frame of User 1 is no longer visible by User 2. User 2 may not be able to measure headpose and therefore virtual content could begin to float or shift with User 2 movement. Instead, as depicted in FIG. 8C, a new world 2 coordinate frame may be created, despite lower reliability in the world.

In some embodiments, a mixed reality system (e.g., mixed reality system 1212 or 1300) can receive a world coordinate frame from a server. For example, a room may have been mapped by a previous mixed reality system, and an established world coordinate frame can be uploaded to a server. When a new user enters the same room, a mixed reality system can recognize that the room has been previously mapped and receive an appropriate world coordinate frame from the server. A mixed reality system can identify a room using location tracking (e.g., GPS coordinates or Wi-Fi triangulation) and/or using computer vision (e.g., recognizing features in the room and matching those features with features of previously mapped rooms). In some embodiments, a world coordinate frame received from a server can be more reliable than a world coordinate frame established by User 1 or User 2. For example, each mixed reality system that maps the room can upload additional information to a server, thereby increasing the reliability of a cumulative world coordinate frame stored in a server. Upon recognizing that a room has a previously-established world coordinate frame, a mixed reality system or a server can determine which one of several world coordinate frames is more reliable, and a mixed reality system can utilize the most reliable world coordinate frame.

Figure 9A:
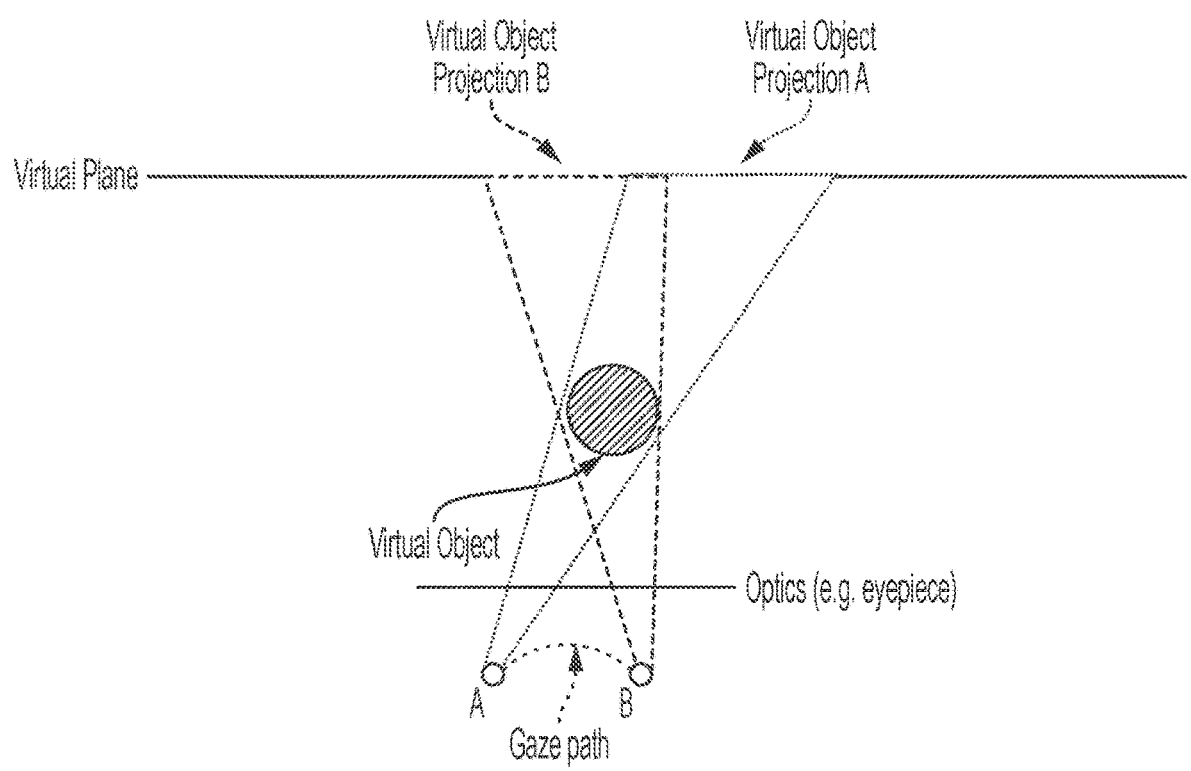
FIGS. 9A-9B illustrate device to render camera coordinate frame transform options according to some embodiments.

FIG. 9A depicts a first render camera protocol for transforming to a display unit from a head coordinate. As depicted, a user's pupil for a single eye moves from position A to B. For an optical eyepiece displaying a virtual object, given an optical power, a virtual object that is meant to appear stationary can project in 3D at one of two positions based on the pupil position (assuming the render camera is configured to use a pupil as the coordinate frame). In other words, using a pupil coordinate transformed to a head coordinate can cause jitter in a stationary virtual content as the user's eyes move. This is referred to as a view dependent display or projection system.

Figure 9B:
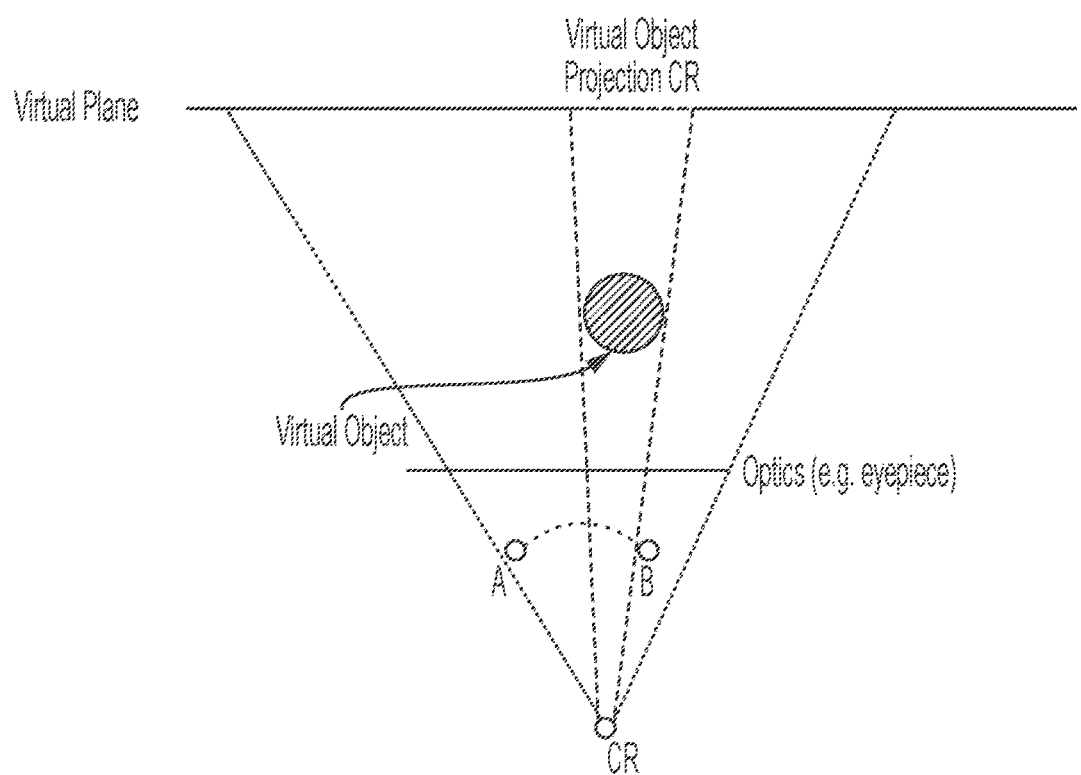

In some embodiments, as depicted in FIG. 9B, a Camera Render frame is positioned that encompasses all pupil positions, for example at the center of rotation of the eyeball. An object projection CR area can be consistent regardless of the pupil position A and B. The head coordinate can transform to the Camera Render frame, which is referred to as a view independent display or projection system. In some embodiments, an image warp is applied to the virtual content to account for a change in eye position, but as this still renders at the same position, jitter can be minimized.

Synchronized Virtual Content

Given an environment wherein virtual content may be shared, further embodiments are enabled by the coordinate frame protocols as detailed above.

Figure 10A:
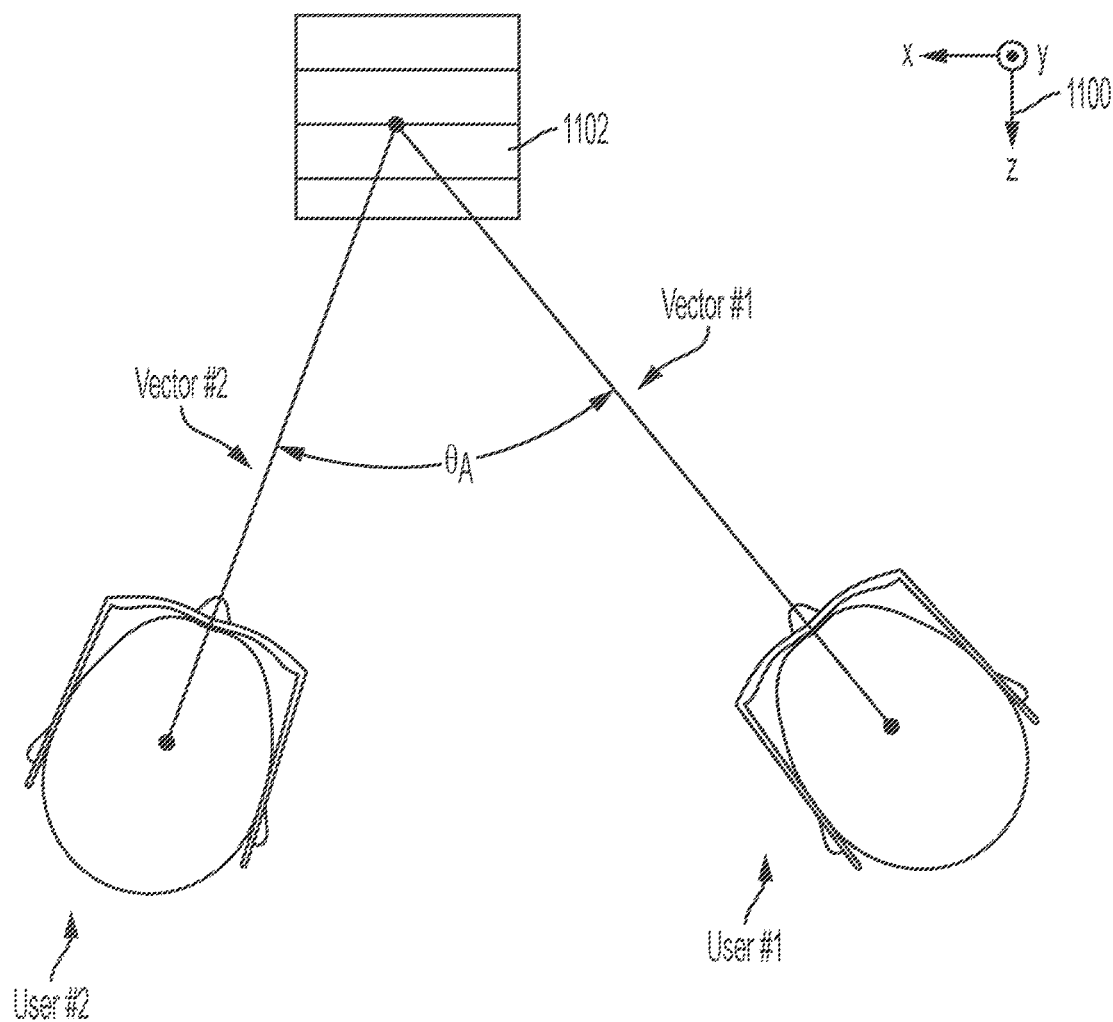
FIGS. 10A-10B illustrate angular relationships between viewers and resultant virtual content displays, according to some embodiments.

FIG. 10A illustrates a shared virtual object 1102 displayed to both User 1 and User 2. User 1 and User 2 can have viewing vectors 1 and 2 respectively, as measured in an exemplary x-y-z world coordinate frame 1100 relative to virtual object 1102. In some embodiments, an angular difference $\theta_A$ can be measured between the two vectors. Though vectors 1 and 2 can be measured from the users to virtual content 1102 based on the users angular position to virtual content in the world coordinate frame, $\theta_A$ can be coordinate frame agnostic as it can be a comparison of vectors rather than an absolute measurement. In other words, if User 1 and User 2 were using disparate world coordinate frames, transformations between the two frames would be necessary only to determine angular difference $\theta_A$, but $\theta_A$ itself is not dependent on using a particular world coordinate frame.

To enhance shared interaction among all viewers, rather than display content to all viewers with content fixed to a local coordinate frame, in some embodiments presentation can be made based on angular relation to a designator user.

Figure 10B:
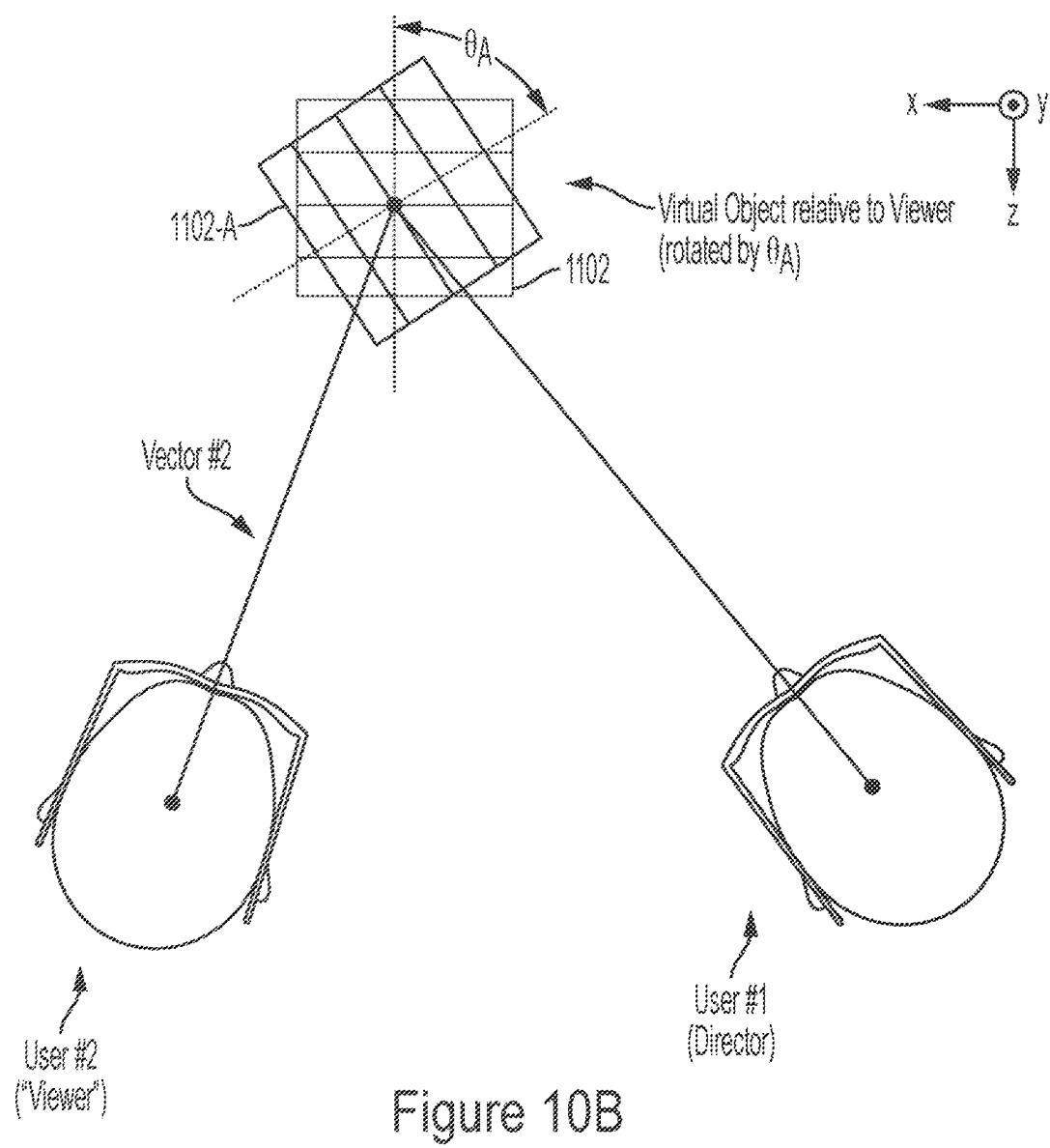

FIG. 10B illustrates a synchronized view between User 1 and User 2, wherein User 1 can be designated as a "director" that controls the perspective of viewing virtual content 1102, or host, to control the perspective of all users viewing virtual content 1102. At a time $t_A$ that User 1 is made the director of the view, virtual content can be displayed with a perspective equal to that of User 1 to all users that User 1 is in a shared content viewing mode with. User 2, as the viewer of the shared director view, can have virtual content 1102-A displayed to User 2, which may be virtual object 1102 rotated by the angular difference $\theta_A$ at time $t_A$.

For the duration of User 1's status as director among the users, virtual content 1102 can display to the plurality of users at times $t_n$ with angular rotation $\theta_n$ reflecting the angular difference between a respective viewing user and the directing user at a given time.

Figure 11A:
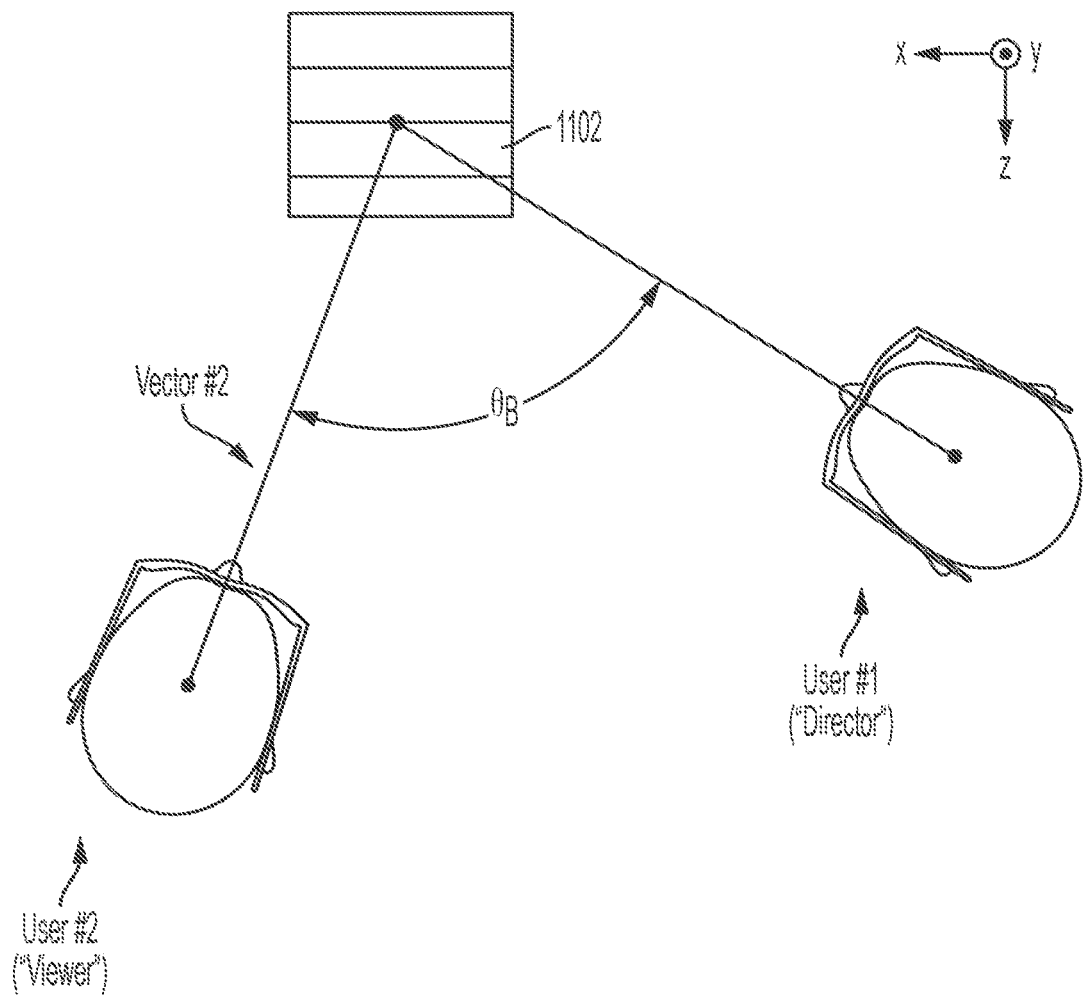
FIGS. 11A-11C illustrate additional angular relationships between viewers with distance variations and resultant virtual content displays, according to some embodiments.
Figure 11B:
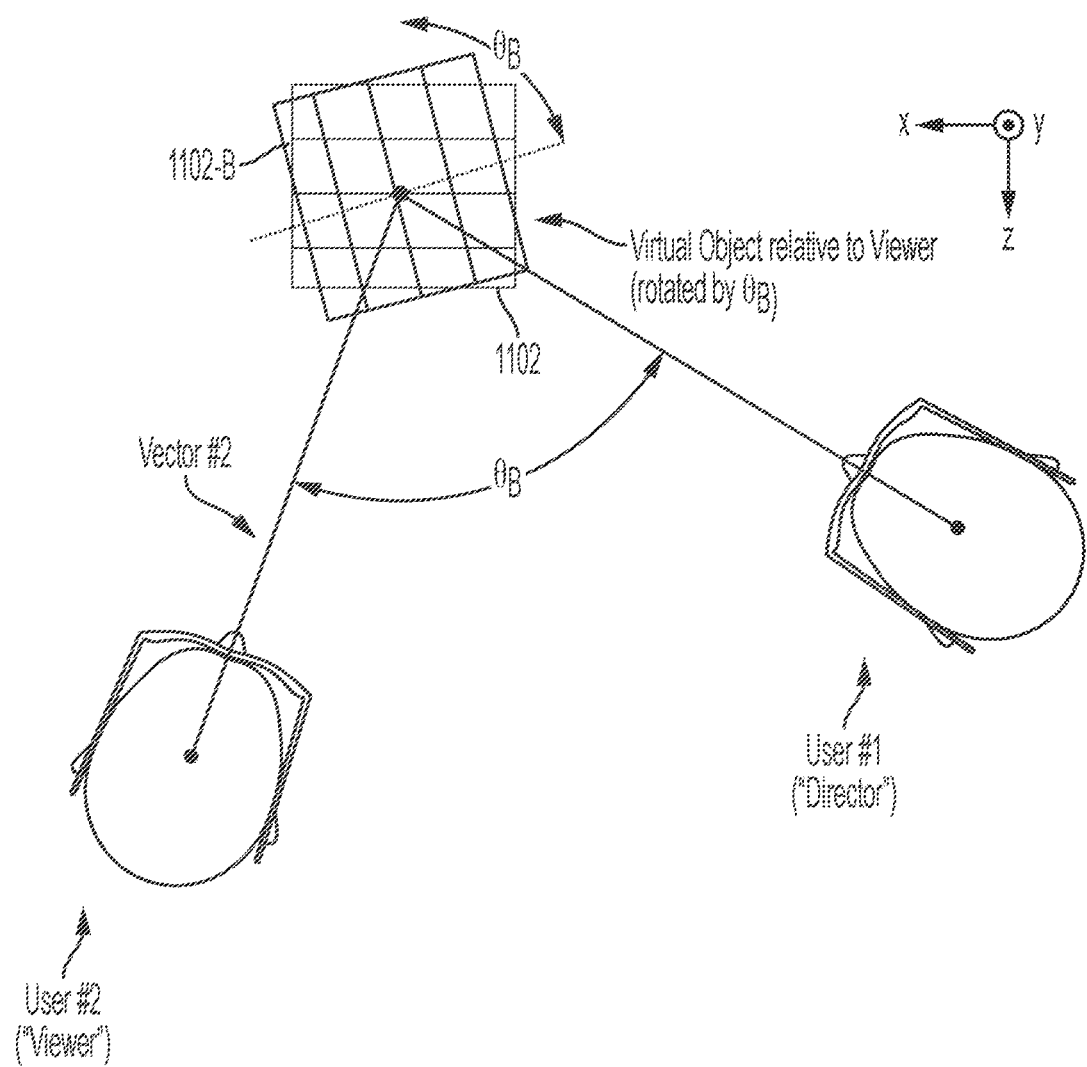

FIGS. 11A-B further illustrate this, as User 1 in director mode moves about virtual object 1102 at time $t_B$ to have angular difference $\theta_B$ with User 2 (as shown in FIG. 11A). FIG. 11B illustrates the new angular rotation to display virtual content 1102-B to User 2. The cumulative effect of the angular changes of User 1 as displayed to User 2 can be that virtual content 1102 will appear to rotate relative to User 2, despite User 2 not physically moving.

Figure 11C:
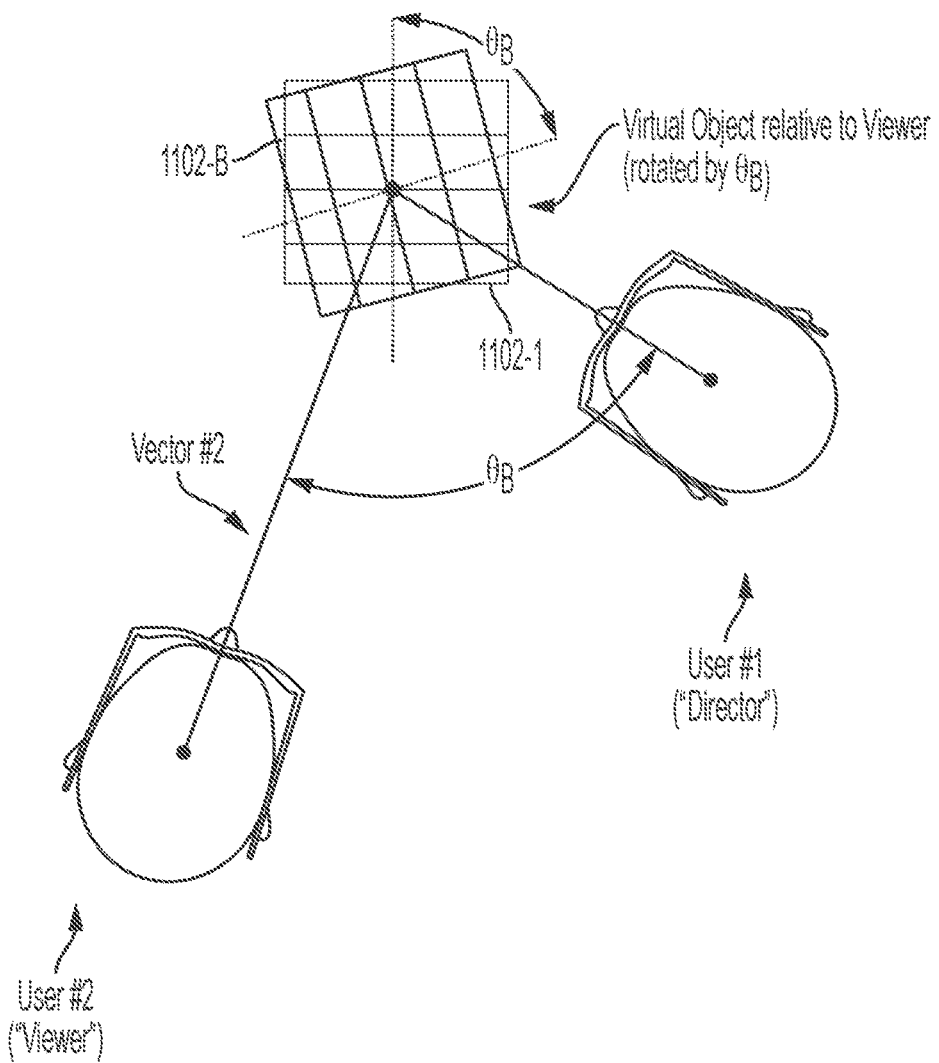

In some embodiments, the director view can be an angular change only and relative distance of the director to the virtual content will not affect how the viewing users will have the virtual content displayed to them. FIG. 11C illustrates a scenario wherein User 1, the director, has moved to a position having an angular difference $\theta_B$ to User 2, but has also decreased the distance to virtual content 1102 as compared to the distance of User 1 in FIGS. 11A and 11B. In some embodiments, this may generate only an angular rotation to User 2, such that virtual content 1102-B is displayed having rotated only. Whereas virtual content can display as a scaled virtual content 1102-1 to User 1, User 2 may not see a similarly scaled version of 1102-B. In some embodiments, the display of virtual content can scale relative to User 1's position relative to a local coordinate frame for virtual content 1102, but as this embodiment of shared perspective view accounts for angular difference, such distance scaling may not be displayed to shared viewers.

Figure 11D:
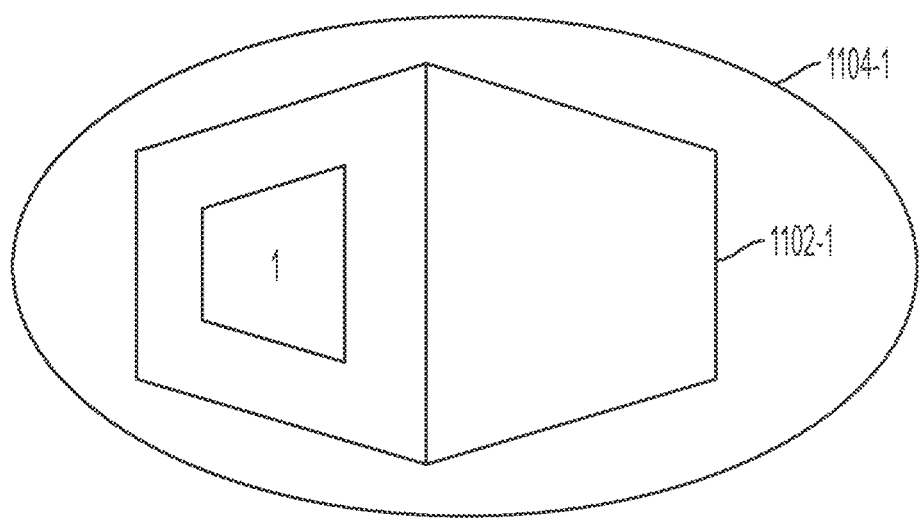
FIGS. 11D-11E illustrate resultant virtual content perception based on angular differences among users according to some embodiments.
Figure 11E:
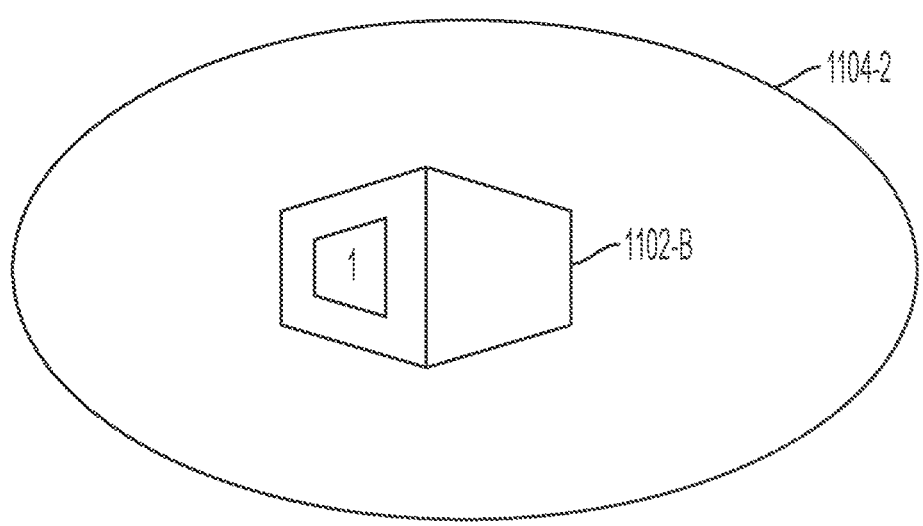

FIGS. 11D-11E illustrate this relationship for how virtual content may be displayed to User 1 and User 2 with User 1 as the director. FIG. 11D illustrates User 1's field of view 1104-1 through which virtual content 1102-1 can be displayed according to User 1's position relative to virtual content 1102 as both a function of angular and distance position. FIG. 11E illustrates User 2's field of view 1104-2 through which virtual content 1102-B can be displayed according to User 2's angular difference to User 1 but not User 2's distance from virtual content 1102.

In some embodiments, virtual content displayed in a synchronized viewing mode can be displayed to one or more viewing users exclusively from a perspective of a hosting user. For example, a hosting user (which can be the director) can select virtual content to display in a synchronized viewing mode. One or more viewing users can then view the selected virtual content from the perspective of the hosting user. In some embodiments, the synchronized virtual content can be displayed irrespective of a coordinate frame of the viewing user. For example, one or more viewing users can view the synchronized virtual content in the center of a field of view of a viewing user. Synchronized virtual content displayed irrespective of a coordinate frame of a viewing user can display virtual content that may not be fixed relative to a head-pose and/or location of a viewing user. For example, a viewing user can move around and look in different directions while wearing a mixed reality system (which can correspond to mixed reality systems 1212 or 1300), but synchronized virtual content may continue to be displayed to a viewing user from a perspective of a hosting user.

In some embodiments, synchronized virtual content can be displayed to one or more viewing users using one or more coordinate frames of a viewing user. For example, synchronized virtual content may be displayed to a viewing user using a world coordinate frame and a local coordinate frame. A center of the virtual content can be fixed to a coordinate in a local coordinate frame, which can be transformed to a world coordinate frame (or other coordinate frames). Although a center of the virtual content can be fixed to a coordinate frame, a perspective of synchronized virtual content can be synchronized to a perspective of a hosting user. For example, as a hosting user walks around synchronized virtual content, the synchronized virtual content can be displayed as rotating to a viewing user who is looking at the synchronized virtual content such that the viewing user shares a perspective with the hosting user. In some embodiments, as a hosting user moves closer or farther away from synchronized virtual content, the synchronized virtual content displayed to a viewing user may scale such that its size appears the same to both the viewing user and the hosting user. In some embodiments, as a hosting user moves closer or farther away from synchronized virtual content, the synchronized virtual content displayed to a viewing user may not scale (e.g., as the host user moves closer, the synchronized virtual content displayed to a viewing user does not appear larger in size). If a viewing user shifts perspectives and looks away from the synchronized virtual content, the synchronized virtual content may no longer be displayed to the viewing user, and the synchronized virtual content may remain centered at a fixed position in a coordinate frame. In some embodiments, a hosting user and a viewing user can share coordinate frames (e.g., a world coordinate frame and/or a local coordinate frame) to maintain consistency in placement of synchronized virtual content.

In some embodiments, a hosting user can manipulate synchronized virtual content, which can be displayed to a viewing user. For example, a hosting user can resize synchronized virtual content to a larger or smaller size. A hosting user can also rotate synchronized virtual content without physically moving and shifting the hosting user's perspective of the synchronized virtual content. A hosting user can also reposition synchronized virtual content to a different location, which can be established using coordinate frames and/or transformation matrices. A viewing user can view synchronized virtual content while a hosting user manipulates synchronized virtual content such that a viewing user maintains the same perspective of the synchronized virtual content as a hosting user. In some embodiments, a hosting user can be a user using a mixed reality system (e.g., mixed reality system 1212 or 1300). In other embodiments, a hosting user can manipulate or view synchronized virtual content using a computer or a mobile device, which may have a 2D screen.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A method comprising:
    determining a perspective view of a virtual object, wherein the perspective view is based at least in part on a view axis of a first wearable head device;
    determining whether a presentation mode comprises a first mode or a second mode;
    in accordance with a determination that the presentation comprises the first mode, adjusting a size of the virtual object based on at least one of (1) a distance between the first wearable head device and the virtual object and (2) a distance between a second wearable head device and the virtual object;
    in accordance with a determination that the presentation comprises the second mode, forgoing adjusting the size of the virtual object; and
    presenting the virtual object, via a display of the second wearable head device, according to the perspective view.

2. The method of claim 1, wherein the presentation mode is determined based on an input to the first wearable head device.

3. The method of claim 1, wherein the adjusting the size of the virtual object comprises adjusting the size of the virtual object based on a ratio between (1) the distance between the second wearable head device and the virtual object and (2) the distance between the first wearable head device and the virtual object.

4. The method of claim 1, wherein the perspective view of the virtual object is determined via a server.

5. The method of claim 1, wherein the perspective view of the virtual object is determined via one or more sensors of the first wearable head device.

6. The method of claim 1, wherein the perspective view of the virtual object is determined based on an input to the first wearable head device.

7. The method of claim 1, further comprising:
    determining a movement of the second wearable head device; and
    in accordance with the determined movement and a second determination that the presentation comprises the first mode, adjusting a size of the virtual object based on a second distance between the second wearable head device and the virtual object; and
    in accordance with the determined movement and a second determination that the presentation comprises the second mode, forgoing adjusting the size of the virtual object.

8. The method of claim 1, further comprising:
    determining whether the presentation mode comprises a third mode; and
    in accordance with a determination that the presentation mode comprises the third mode, adjusting the size of the virtual object according to an input to the first wearable head device.

9. The method of claim 1, wherein the determining the perspective view of the virtual object comprises determining a position of the virtual object presented via the display of the second wearable head device.

10. A system comprising:
    one or more processors in communication with a first wearable head device and further in communication with a second wearable head device, the one or more processors configured to perform a method comprising:
    determining a perspective view of a virtual object, wherein the perspective view is based at least in part on a view axis of a first wearable head device;

determining whether a presentation mode comprises a first mode or a second mode;

in accordance with a determination that the presentation comprises the first mode, adjusting a size of the virtual object based on at least one of (1) a distance between the first wearable head device and the virtual object and (2) a distance between a second wearable head device and the virtual object;

in accordance with a determination that the presentation comprises the second mode, forgoing adjusting the size of the virtual object; and presenting the virtual object, via a display of the second wearable head device, according to the perspective view.

11. The system of claim 10, wherein the presentation mode is determined based on an input to the first wearable head device.

12. The system of claim 10, wherein the adjusting the size of the virtual object comprises adjusting the size of the virtual object based on a ratio between (1) the distance between the second wearable head device and the virtual object and (2) the distance between the first wearable head device and the virtual object.

13. The system of claim 10, wherein the perspective view of the virtual object is determined via a server.

14. The system of claim 10, wherein the perspective view of the virtual object is determined via one or more sensors of the first wearable head device.

15. The system of claim 10, wherein the perspective view of the virtual object is determined based on an input to the first wearable head device.

16. The system of claim 10, wherein the method further comprises:

determining a movement of the second wearable head device; and in accordance with the determined movement and a second determination that the presentation comprises the first mode, adjusting a size of the virtual object based on a second distance between the second wearable head device and the virtual object; and in accordance with the determined movement and a second determination that the presentation comprises the second mode, forgoing adjusting the size of the virtual object.

17. The system of claim 10, further comprising:

determining whether the presentation mode comprises a third mode; and in accordance with a determination that the presentation mode comprises the third mode, adjusting the size of the virtual object according to an input to the first wearable head device.

18. The system of claim 10, wherein the determining the perspective view of the virtual object comprises determining a position of the virtual object presented via the display of the second wearable head device.

19. A non-transitory computer-readable medium storing instructions which, when executed by one or more processors, cause the one or more processors to perform a method comprising:

determining a perspective view of a virtual object, wherein the perspective view is based at least in part on a view axis of a first wearable head device;

determining whether a presentation mode comprises a first mode or a second mode;

in accordance with a determination that the presentation comprises the first mode, adjusting a size of the virtual object based on at least one of (1) a distance between the first wearable head device and the virtual object and (2) a distance between a second wearable head device and the virtual object;

in accordance with a determination that the presentation comprises the second mode, forgoing adjusting the size of the virtual object; and presenting the virtual object, via a display of the second wearable head device, according to the perspective view.

20. The non-transitory computer-readable medium of claim 19, wherein the presentation mode is determined based on an input to the first wearable head device.

\* \* \* \* \*